United States Patent
Eto et al.

(10) Patent No.: US 7,775,867 B2
(45) Date of Patent: Aug. 17, 2010

(54) STORAGE MEDIUM STORING A GAME PROGRAM, GAME APPARATUS, AND GAME CONTROL METHOD

(75) Inventors: Keita Eto, Tokyo (JP); Yoshikazu Fujita, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 808 days.

(21) Appl. No.: 11/714,101

(22) Filed: Mar. 6, 2007

(65) Prior Publication Data
US 2008/0102951 A1    May 1, 2008

(30) Foreign Application Priority Data
Nov. 1, 2006   (JP) ............................ 2006-298201

(51) Int. Cl.
*A63F 9/24*   (2006.01)
(52) U.S. Cl. ........................................... 463/9; 463/37
(58) Field of Classification Search ....................... None
See application file for complete search history.

(56) References Cited

U.S. PATENT DOCUMENTS 5,265,888 A  * 11/1993  Yamamoto et al. ............ 463/10
5,769,716 A  *  6/1998  Saffari et al. .................. 463/20
5,833,536 A  * 11/1998  Davids et al. ................. 463/11
2006/0073863 A1 * 4/2006  Hagiwara ....................... 463/9

FOREIGN PATENT DOCUMENTS

JP       11-137842       5/1999
JP      2001-038047      2/2001

* cited by examiner

*Primary Examiner*—M. Sager
(74) *Attorney, Agent, or Firm*—Nixon & Vanderhye PC

(57) ABSTRACT

A game apparatus includes an LCD and a touch panel is provided on the LCD. On the LCD is displayed a game screen on which objects of different types are disposed so as to be aligned in a reticular pattern. By a player touching a desired object, a three-dimensional location of the object is set as a point of gaze of a virtual camera. Then, by the player moving a touch location, the location of the virtual camera (viewpoint) is changed according to the movement. In a virtual space, different layers are provided for the different types of objects. The objects are disposed so as not to overlap with each other between the different layers. When the viewpoint is fixed and a plurality of objects of different types intersecting a line of sight or a line parallel to the line of sight satisfy a predetermined condition, the objects are deleted.

8 Claims, 16 Drawing Sheets

(A) TOP LAYER 200a (B) INTERMEDIATE LAYER 200b (C) BOTTOM LAYER 200c

FIG. 5

RENDER AREAS (4x5) FOR EACH LAYER

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

(A) GAME SCREEN 100 (UPON START OF TOUCH) — POINT OF GAZE (B) GAME SCREEN 100 (UPON CHANGE OF VIEWPOINT)

LINE OF SIGHT

VIEWPOINT (A) GAME SCREEN 100

(B) GAME SCREEN 100

STORAGE MEDIUM STORING A GAME PROGRAM, GAME APPARATUS, AND GAME CONTROL METHOD

CROSS REFERENCE OF RELATED APPLICATION

The disclosure of Japanese Patent Application No. 2006-298201 is incorporated herein by reference.

BACKGROUND OF THE INVENTION

1. Field of the Invention

The present invention relates to a storage medium storing a game program, a game apparatus, and a game control method. More particularly, the present invention relates to a storage medium storing a game program, a game apparatus, and a game control method, for playing a puzzle game, for example.

2. Description of the Related Art

In a puzzle game generally well known as a falling block game, when attributes of a plurality of adjacent objects satisfy a predetermined condition, these objects are deleted. An example of related art of this kind is disclosed in Japanese Patent Laying-open No. 2001-38047 [A63F 13/00, A63F 13/10] laid-open on Feb. 13, 2001 (Document 1). In a three-dimensional puzzle game apparatus disclosed in Document 1, a plurality of panels of different types are disposed on a cylindrical game field and a player plays a game such that he/she swaps adjacent panels with a predetermined cylindrical side being displayed. Then, when a match of at least a predetermined number of panels of the same type is created in a longitudinal or lateral direction, the panels of the matched type are deleted.

In addition, it is already known that from which viewpoint in a three-dimensional virtual space a player sees a game played in the three-dimensional virtual space is determined according to a player's operation and it is displayed as a two-dimensional game screen. An example of related art of this kind is disclosed in Japanese Patent Laying-open No. 11-137842 [A63F 9/22] laid-open on May 25, 1999 (Document 2). According to Document 2, a game player operates a control pad on a game apparatus main body to move a player character disposed in a virtual space in a desired direction. When the player character is caused to stop, a viewpoint of a virtual camera can be moved according to a game player's operation. A technique in which a behavior of the viewpoint of the virtual camera is improved is disclosed.

However, it seems that there are no more new ideas to be generated for the falling block game such as the one disclosed in Document 1 and even if a new falling block game appears, it can be said that the game is lacking freshness for players. On the other hand, in the technique of Document 2, the viewpoint of the virtual camera is moved only for a game operation, such as finding an object unseen on a screen, and the movement of the viewpoint of the virtual camera itself is not enjoyed as a game operation.

Even if the techniques described in these documents are combined, such combination can only provide better viewing of a game screen or cause movement of a viewpoint to make an unseen object to be seen in a falling block game, for example; thus, a new game cannot be provided.

SUMMARY OF THE INVENTION

Therefore, it is primary object of the present invention to provide a novel storage medium storing a game program, game apparatus, and game control method.

It is another object of the present invention to provide a storage medium storing a game program, a game apparatus, and a game control method allowing to play a novel puzzle game.

The present invention adopts the following construction in order to solve the above-described problems. It should be noted that reference numerals and footnote, etc. which are enclosed in parentheses show only one example of correspondences with the embodiment described later in order to help the understandings of the present invention, and do not limit the present invention.

A storage medium storing a game program according to the present invention stores a game program to be performed by a game apparatus having a display means, an operation means, and a storage means. The game program causes a computer of the game apparatus to perform an object disposition step, a point-of-gaze setting step, a viewpoint setting step, a game image display step, a line-of-sight calculation step, a determination step, and a deletion step. In the object disposition step, a plurality of objects, the objects each having any one of a predetermined number of attributes, are disposed in a three-dimensional virtual space based on object data stored in the storage means. In the point-of-gaze setting step, a point of gaze is set based on an input by the operation means. In the viewpoint setting step, after the point of gaze is set in the point-of-gaze setting step, a viewpoint is set in the three-dimensional virtual space based on an input by the operation means. In the game image display step, a game image is displayed on the display means based on the point of gaze set in the point-of-gaze setting step and the viewpoint set in the viewpoint setting step. In the line-of-sight calculation step, a line of sight and a straight line parallel to the line of sight are calculated based on the point of gaze set in the point-of-gaze setting step and the viewpoint set in the viewpoint setting step. In the determination step, it is determined whether or not the attributes of the plurality of objects intersecting the line of sight or the straight line parallel to the line of sight calculated in the line-of-sight calculation step satisfy a predetermined condition. In the deletion step, when it is determined in the determination step that the predetermined condition is satisfied, objects satisfying the predetermined condition are deleted.

Specifically, a game apparatus (10) includes a display means (14), an operation means (22, 24), and a storage means (72). A game program causes a computer (including 34) of the game apparatus to perform an object disposition step (S1), a point-of-gaze setting step (S11), a viewpoint setting step (S13), a game image display step (S13, S15), a line-of-sight calculation step (S19), a determination step (S55), and a deletion step (S57). In the object disposition step, a plurality of objects, each having any one of a predetermined number of attributes, are disposed in a three-dimensional virtual space (game space) based on object data (72d, 730 to 73n) stored in the storage means. In the point-of-gaze setting step, a point of gaze is set based on an input by the operation means. For example, the location coordinates of an object pointed to by a player is set as the point of gaze. In the viewpoint setting step, after the point of gaze is set in the point-of-gaze setting step, a viewpoint is set in the three-dimensional virtual space based on an input by the operation means. That is, the location of a virtual camera in the three-dimensional virtual space is moved (set). In the game image display step, a game image is displayed on the display means based on the point of gaze set in the point-of-gaze setting step and the viewpoint set in the viewpoint setting step. Here, a three-dimensional game image as viewed from the virtual camera (viewpoint) to the direction of the point of gaze is projected onto a virtual screen and therefore a two-dimensional game image is displayed on the display means. In the line-of-sight calculation step, a line of sight (V) and a straight line (L) parallel to the line of sight are calculated based on the point of gaze set in the point-of-gaze setting step and the viewpoint set in the viewpoint setting step. In the determination step, it is determined whether or not the attributes of the plurality of objects intersecting the line of sight or the straight line parallel to the line of sight calculated in the line-of-sight calculation step satisfy the predetermined condition. In the deletion step, when it is determined in the determination step that the predetermined condition is satisfied ("YES" in S55), objects satisfying the predetermined condition are deleted.

According to the invention, when, by the player setting the viewpoint and the line of sight, the plurality of objects intersecting the line of sight and a straight line parallel to the line of sight satisfy the predetermined condition, the objects are deleted. Thus, it is possible to provide an unprecedented puzzle game in which the player works out the relationship between an arrangement of objects and the line of sight or the straight line parallel to the line of sight.

In one aspect of the present invention, in the object disposition step, on a predetermined number of layers parallel to each other, objects unique to the layers, respectively, are disposed so as not to overlap with each other between the layers. Specifically, in the object disposition step, on a predetermined number of layers parallel to each other in the three-dimensional virtual space, objects unique to the layers, respectively, are disposed. At this time, the objects are disposed so as not to overlap with each other between the layers. For example, the layers each are divided into a predetermined number of areas by the same division method and a plurality of objects are not disposed in render areas at an identical location of the different layers. That is, since disposition of objects in the three-dimensional virtual space has regularity, an index for when the player images the disposition of objects can be provided.

In another aspect of the present invention, in the game image display step, a bird's eye view image from a vertical direction of the predetermined number of the layers parallel to each other is displayed as a game image until at least the point of gaze is set in the point-of-gaze setting step. Specifically, until at least the point of gaze in the three-dimensional virtual space is set in the point-of-gaze setting step, for example, a viewpoint is set to the location and direction of a default setting. At this time, a bird's eye view image from the vertical direction of the predetermined number of the layers parallel to each other is displayed on the display means as a game image. That is, before setting the viewpoint, a two-dimensional game image in which objects are arranged in a reticular pattern is displayed. As such, since, before setting the viewpoint, the two-dimensional game image is displayed, the player can image, by seeing a two-dimensional object arrangement, an arrangement of the objects in the three-dimensional virtual space.

In still another aspect of the present invention, the objects unique to the layers, respectively, have an attribute of a largest size on a top layer and have an attribute of a smallest size on a bottom layer, when the bird's eye view image is displayed as the game image. Specifically, the objects unique to the layers, respectively, have attributes of different sizes. It includes a case where only the size is different and a case where the objects have similar figures. The objects have an attribute of the largest size on the top layer and have an attribute of the smallest size on the bottom layer, when a bird's eye view image of the three-dimensional virtual space is displayed as a game image, i.e., when viewing the point-of-gaze side from the viewpoint side. As such, since disposition in the three-dimensional virtual space has further regularity, the arrangement of objects in the three-dimensional virtual space can be easily grasped.

In yet another aspect of the present invention, in the deletion step, when, on adjacent layers, sizes of objects intersecting the line of sight or the straight line become smaller toward a side of the point of gaze from a side of the viewpoint and the objects are aligned in a predetermined number, the objects are deleted. Specifically, when, on adjacent layers, the size of objects intersecting the line of sight or the straight line becomes smaller toward the point-of-gaze side from the viewpoint side and the objects are aligned in the predetermined number, i.e., when a plurality of objects are aligned in a predetermined order, it is determined that the predetermined condition is satisfied. Then, in the deletion step, the objects satisfying the predetermined condition are deleted. As such, when the arrangement of objects is such that the size of the objects becomes smaller toward the point-of-gaze side from the viewpoint side in the three-dimensional virtual space, the objects are deleted. Thus, it is possible to provide the player with the fun of a new game allowing the player to image the arrangement of objects in the three-dimensional virtual space.

In another aspect of the present invention, in the object disposition step, objects being stored in the storage means, being hollow inside in a direction vertical to the layers and having an outer rim are disposed based on the object data. Specifically, objects are hollow inside in the direction vertical to the layers on which the objects are disposed in the three-dimensional virtual space and have an outer rim. Thus, when a plurality of objects in different sizes are aligned on different layers in order from the viewpoint side to the point-of-gaze side, a game image in which a tunnel is formed by the plurality of objects is displayed. As such, since the player moves the viewpoint such that a tunnel is formed by a plurality of objects, it is possible to provide the player with the feeling of accomplishment obtained when a puzzle is solved.

A game apparatus according to the present invention has a display means, an operation means, and a storage means. The game apparatus includes an object disposition means, a point-of-gaze setting means, a viewpoint setting means, a game image display means, a line-of-sight calculation means, a determination means, and a deletion means. The object disposition means disposes a plurality of objects each having any one of a predetermined number of attributes in a three-dimensional virtual space based on object data stored in the storage means. The point-of-gaze setting means sets a point of gaze based on an input by the operation means. The viewpoint setting means sets, after the point of gaze is set by the point-of-gaze setting means, a viewpoint in the three-dimensional virtual space based on an input by the operation means. The game image display means displays a game image on the display means based on the point of gaze set by the point-of-gaze setting means and the viewpoint set by the viewpoint setting means. The line-of-sight calculation means computes a line of sight and a straight line parallel to the line of sight based on the point of gaze set by the point-of-gaze setting means and the viewpoint set by the viewpoint setting means. The determination means determines whether or not the attributes of the plurality of objects intersecting the line of sight or the straight line parallel to the line of sight calculated by the line-of-sight calculation means satisfy a predetermined condition. The deletion means deletes, when it is determined by the determination means that the predetermined condition is satisfied, objects satisfying the predetermined condition.

As with the invention of the above-described storage medium, the invention of the game apparatus can also provide an unprecedented puzzle game.

A game control method according to the present invention is a game control method for a game apparatus having a display means, an operation means, and a storage means. The game control method includes the following steps of: (a) disposing a plurality of objects each having any one of a predetermined number of attributes in a three-dimensional virtual space based on object data stored in the storage means; (b) setting a point of gaze based on an input by the operation means; (c) setting, after the point of gaze is set in the step (b), a viewpoint in the three-dimensional virtual space based on an input by the operation means; (d) displaying a game image on the display means based on the point of gaze set in the step (b) and the viewpoint set in the step (c); (e) computing a line of sight and a straight line parallel to the line of sight based on the point of gaze set in the step (b) and the viewpoint set in the step (c); (f) determining whether or not the attributes of the plurality of objects intersecting the line of sight or the straight line parallel to the line of sight calculated in the step (e) satisfy a predetermined condition; and (g) deleting, when it is determined in the step (f) that the predetermined condition is satisfied, objects satisfying the predetermined condition.

As with the invention of the above-described storage medium, the invention of the game control method can also provide an unprecedented puzzle game.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustrative view for describing render areas for objects set on each layer;

DETAILED DESCRIPTION OF THE PREFERRED EMBODIMENTS

Figure 1:
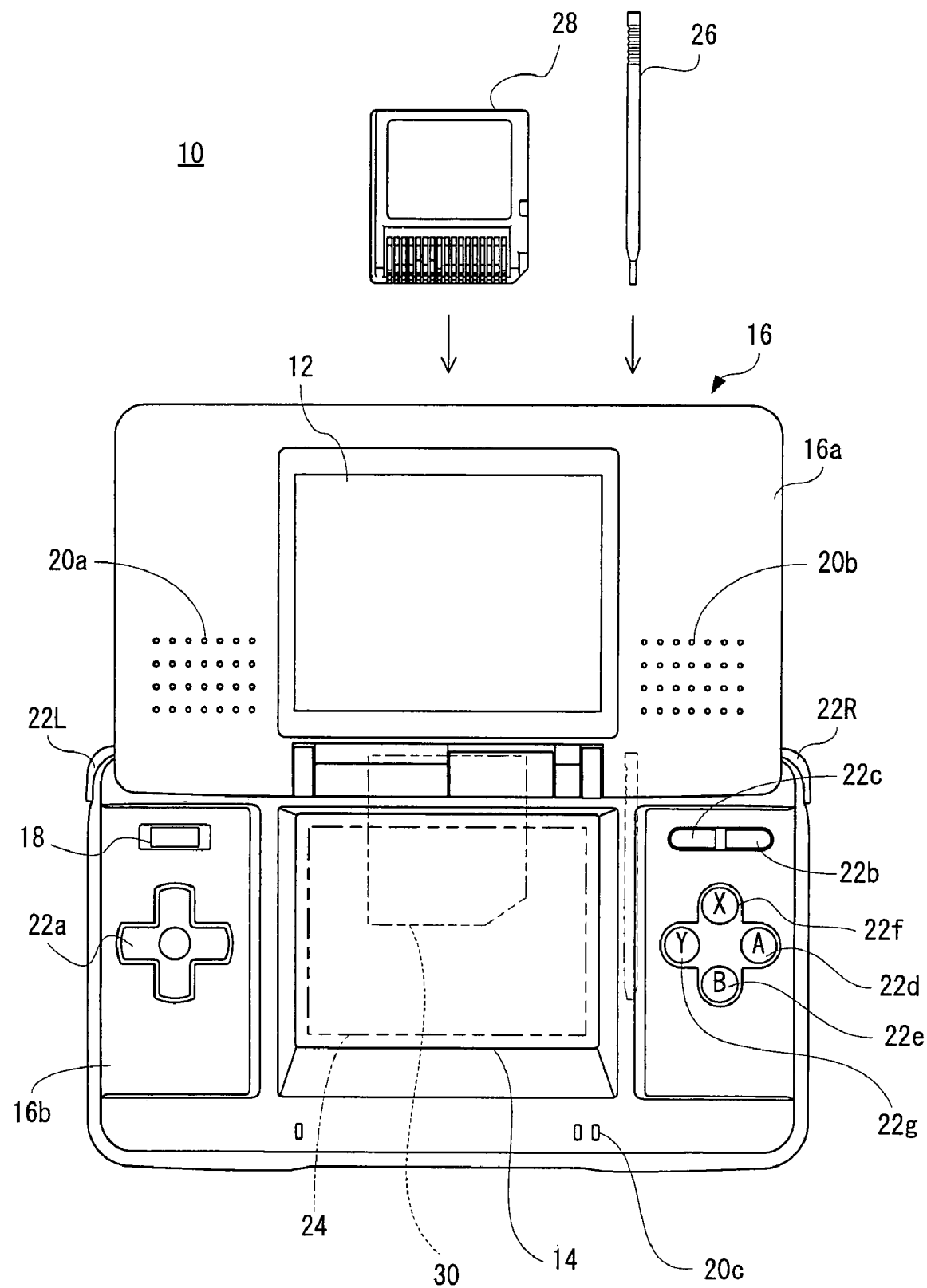
FIG. 1 is an illustrative view showing one embodiment of a game apparatus of the present invention.

Referring to FIG. 1, a game apparatus 10 of an embodiment of the present invention is integrated with a music playing control program to thereby function as a music playing apparatus. The game apparatus 10 includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. A power switch 18 is provided at the left of the LCD 14 of the lower housing 16b.

Furthermore, on the upper housing 16a, sound releasing holes 20a and 20b for speakers 36a and 36b (FIG. 2) are formed by sandwiching the LCD 12 from side to side. Then, on the lower housing 16b, a microphone hole 20c for a microphone (not illustrated) is formed, and operating switches 22 (22a, 22b, 22c, 22d, 22e, 22L and 22R) are provided.

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. Other switches 22b-22g are arranged at the right of the LCD 14 on the one surface of the lower housing 16b. In addition, the switch 22L and the switch 22R are arranged at the right and left corners sandwiching the connected portion with the upper housing 16a on the upper side surface of the lower housing 16b.

The direction instructing switch 22a functions as a digital joystick, and is utilized for instructing a moving direction of a player character (or player object) to be operated by a user or a player and instructing a moving direction of a cursor, and so forth by operating any one of four depression portions. Also, a specific role (chord of the guitar in this embodiment) can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push button, and are utilized for a subsidiary operation when the game cannot be advanced only with the A button 22d and the B button 22e. It should be noted that the X button 22f and the Y button 22g can be used for the similar operation to the A button 22d and B button 22e. Of course, the X button 22f and the Y button 22g are not necessarily utilized in the game play.

The action switch (left depression button) 22L and the action switch (right depression button) 22R are formed by the push button, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles. In this embodiment, when the L button 22L is depressed, the chord assigned to the direction switch 22a is changed to another chord.

Also, on a top surface of the LCD 14, a touch panel 24 is provided. As the touch panel 24, any one of kinds of a resistance film system, an optical system (infrared rays system) and an electrostatic capacitive coupling system, for example, can be utilized. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects a coordinates of an operated position of the stick 26, etc. (that is, touched) to output coordinates data corresponding to the detected coordinates.

It should be noted that in this embodiment, a resolution of the display surface of the LCD 14 (the same is true for the LCD 12) is 256 dots×192 dots, and a detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, operating screen of a game (game screen) may be displayed on the one LCD (LCD 14 in this embodiment), and another game screen including information relating to the game may be displayed on the other LCD (LCD 12 in this embodiment). Furthermore, by utilizing the two LCD 12 and LCD 14 as one screen, it is possible to display a large monster (enemy character) to be defeated by the player character.

Accordingly, the player is able to point (operate) an image such as a player character, an enemy character, an item character, an operating object, etc. to be displayed on the LCD 14 and select commands by operating the touch panel 24 with the use of the stick 26, etc. Also, it is possible to change the direction of a virtual camera (viewpoint) provided in the three-dimensional game space, and instruct (input) a scrolling (gradual moving display) direction of the game screen (map).

It should be noted that depending on the kind of the game, other input instructions can be made with the use of the touch panel 24. For example, it is possible to input a coordinates input instruction, and input texts, numbers, symbols, etc. by hand on the LCD 14.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

In addition, in this embodiment, the stick 26 can be housed in the housing portion (shown by dotted lines in FIG. 1) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on a rear surface or a lower edge (bottom surface) of the lower housing 16b. Although omitted in FIG. 1, a connector 32 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

It should be noted that although not illustrated in FIG. 1, the speakers 36a and 36b (see FIG. 2) are provided at a position corresponding to sound release holes 20a and 20b inside the upper housing 16a.

Furthermore although omitted in FIG. 1, for example, a battery accommodating box is provided on a rear surface of the lower housing 16b, and a volume switch, an external expansion connector, an earphone jack, etc. are provided on a bottom surface of the lower housing 16b.

Figure 2:
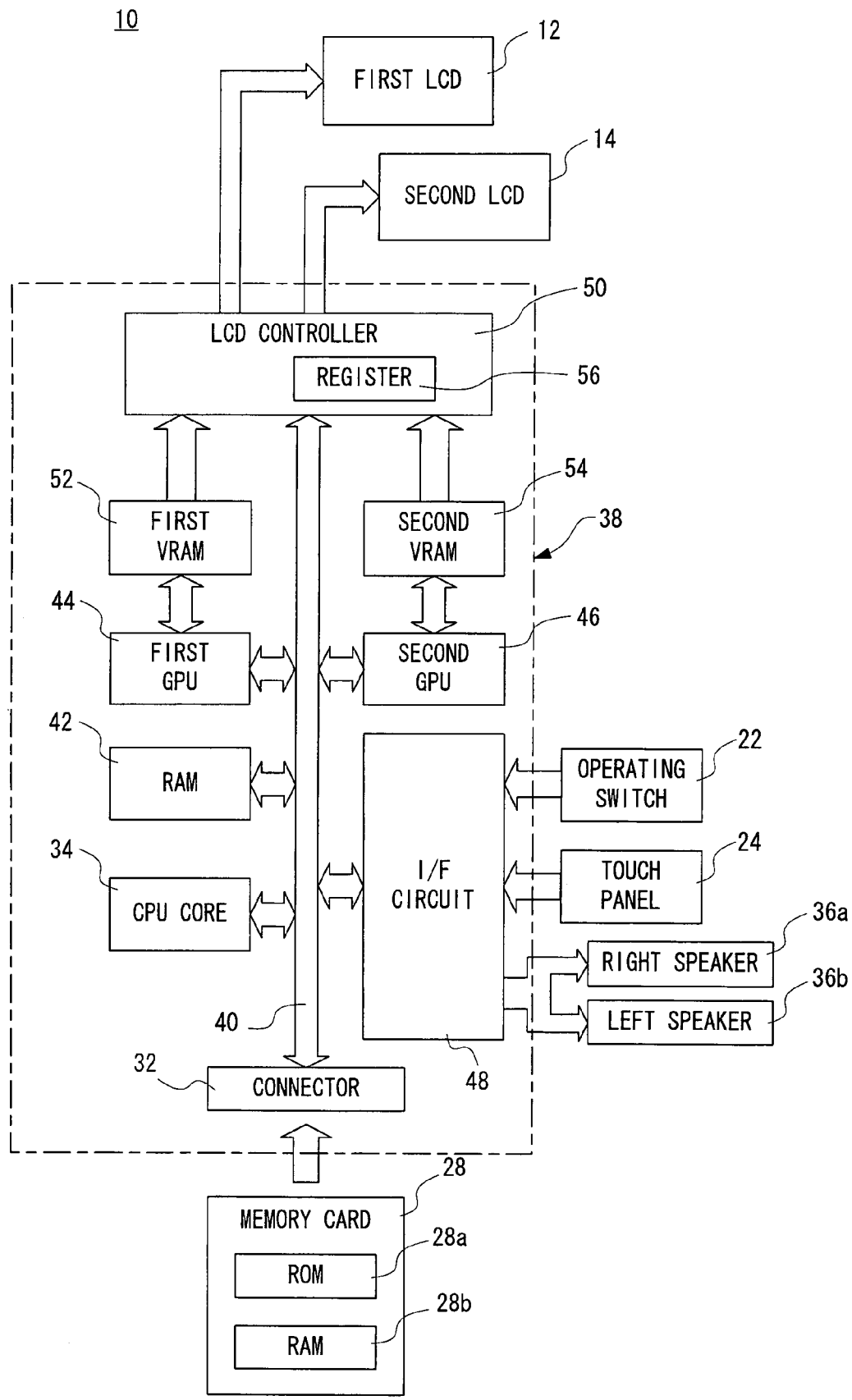
FIG. 2 is a block diagram showing an electrical configuration of the game apparatus shown in FIG. 1.

FIG. 2 is a block diagram showing an electrical configuration of the game apparatus 10. Referring to FIG. 2, the game apparatus 10 includes an electronic circuit board 38, and on the electronic circuit board 38, a circuit component such as a CPU core 34, etc. is mounted. The CPU core 34 is connected to the above-described connector 32 via a bus 40, and is connected with a RAM 42, a first graphics processing unit (GPU) 44, a second GPU 46, an input-output interface circuit (hereinafter, referred to as "I/F circuit") 48, and an LCD controller 50.

The connector 32 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32. Accordingly, the CPU core 34 gains access to the ROM 28a and the RAM 28b as described above.

The ROM 28a stores in advance a game program for a game (music playing game) to be executed by the game apparatus 10, image data (text and character image, background image, item image, icon (button) image, message image, etc.), data of the sound (music) necessary for the game (sound data), etc. The RAM (backup RAM) 28b stores (saves) proceeding data of the game, result data of the game, etc.

The RAM 42 is utilized as a buffer memory or a working memory. That is, the CPU core 34 loads the program, the image data, the sound data, etc. stored in the ROM 28a of the memory card 28 into the RAM 42, and executes the loaded game program. The CPU core 34 executes a game process while storing data (game data, flag data, etc.) generated or obtained in correspondence with a progress of the game in the RAM 42.

It should be noted that the game program, the image data, the sound data, etc. are stored (loaded) from the ROM 28a entirely at a time, or partially and sequentially so as to be stored into the RAM 42.

However, a program as to an application except for the game and image data required to execute the application may be stored in the ROM 28a of the memory card 28. In addition, sound (music) data may be stored therein as necessary. In such a case, in the game apparatus 10, the application is executed.

Each of the GPU 44 and the GPU 46 forms a part of a rendering means, is constructed by, for example, a single chip ASIC, and receives a graphics command from the CPU core 34 to generate image data according to the graphics command. It should be noted that the CPU core 34 applies an image generation program (included in the game program) required to generate the image data to both of the CPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: character data, texture data, etc.) necessary for executing the graphics command.

It should be noted that the CPU core 34 writes image data necessary for rendering to the first VRAM 52 and the second VRAM 54 via the GPU 44 and the GPU 46. The GPU 44 accesses the VRAM 52 to create image data for rendering, and the GPU 46 accesses the VRAM 54 to create image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the GPU 44 to the LCD 12, and outputs the image data created by the GPU 46 to the LCD 14 in a case that the data value of the register 56 is "0". On the other hand, the LCD controller 50 outputs the image data created by the GPU 44 to the LCD 14, and outputs the image data created by the GPU 46 to the LCD 12 in a case that the data value of the register 56 is "1".

It should be noted that the LCD controller 50 can directly read the image data from the VRAM 52 and the VRAM 54, or read the image data from the VRAM 52 and the VRAM 54 via the GPU 44 and the GPU 46.

The I/F circuit 48 is connected with the operating switch 22, the touch panel 24 and the speakers 36a, 36b. Here, the operating switch 22 is the above-described switches 22a, 22b, 22c, 22d, 22e, 22L and 22R, and in response to an operation of the operating switch 22, a corresponding operation signal (operation data) is input to the CPU core 34 via the I/F circuit 48. Furthermore, the coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36a, 36b via the I/F circuit 48.

Figure 3:
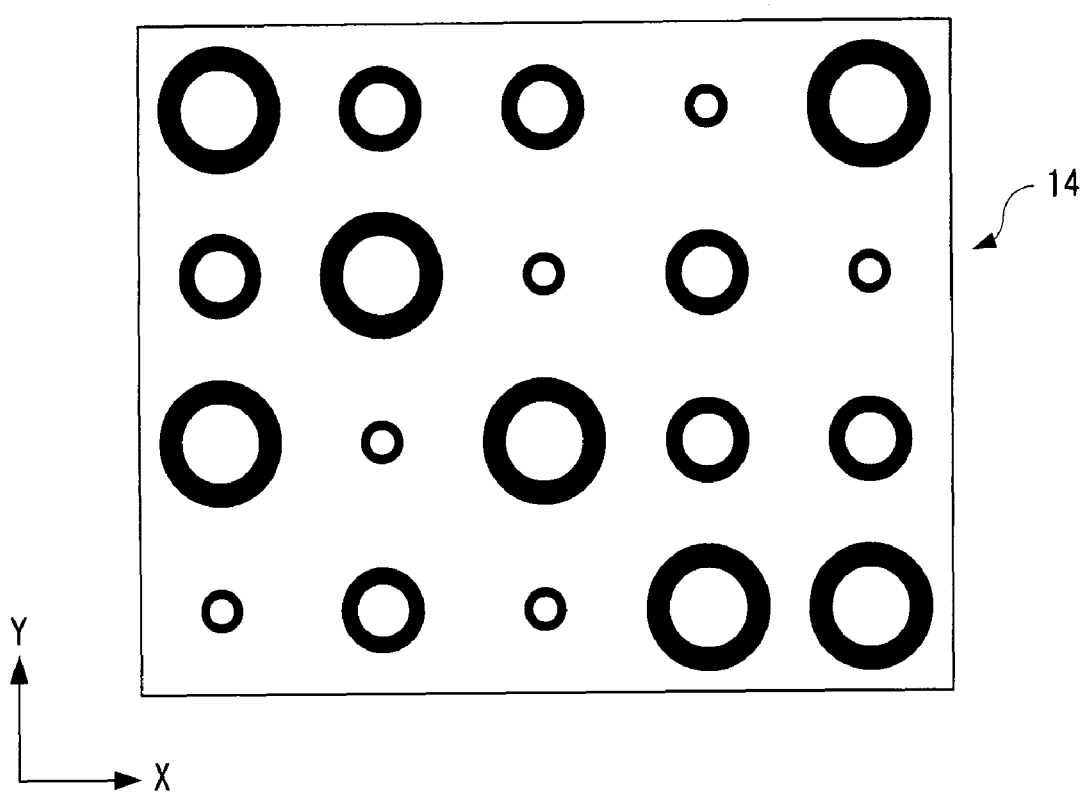
FIG. 3 is an illustrative view showing an example of a game screen displayed on a second LCD of the game apparatus shown in FIG. 1.
Figure 3:
Figure 3:
Figure 3:

FIG. 3 shows an example of a game screen 100 to be displayed on the LCD 14 when a virtual game (puzzle game) of the present embodiment is played using the game apparatus 10 shown in FIG. 1 and FIG. 2. The game screen 100 is an initial screen to be displayed upon the start of a game or the update of a screen. On the initial screen 100, a plurality of objects of different types (attributes) are displayed so as to be aligned in a reticular pattern without any clearance therebetween. Specifically, large ring objects 102, medium ring objects 104, and small ring objects 106 are irregularly (randomly) displayed such that the centers of the respective objects are aligned on a straight line in longitudinal and lateral directions. In the present embodiment, the large ring objects 102, the medium ring objects 104, and the small ring objects 106 each are a ring-shaped hollow object with an outer rim. That is, the large ring objects 102, the medium ring objects 104, and the small ring objects 106 have similar figures. In the present embodiment, the attributes of an object indicate the type of a ring (a large ring object 102, a medium ring object 104, or a small ring object 106, or the size (radius)), the type of a layer (a top layer 200a, an intermediate layer 200b, or a bottom layer 200c, as will be described later) where the object is rendered (disposed), and the number (index number) of a render area of a layer.

Figure 4:
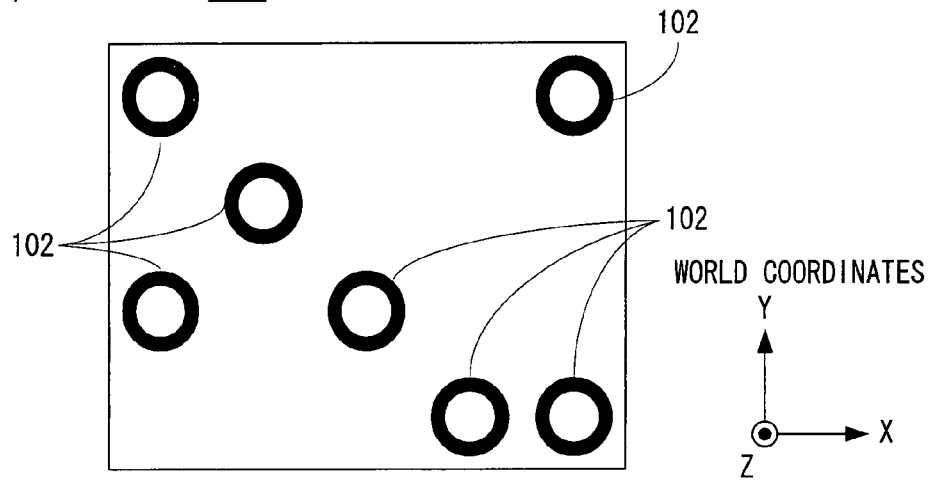
FIG. 4 is an illustrative view showing layers disposed in a three-dimensional virtual space and objects disposed on the respective layers.
Figure 4:
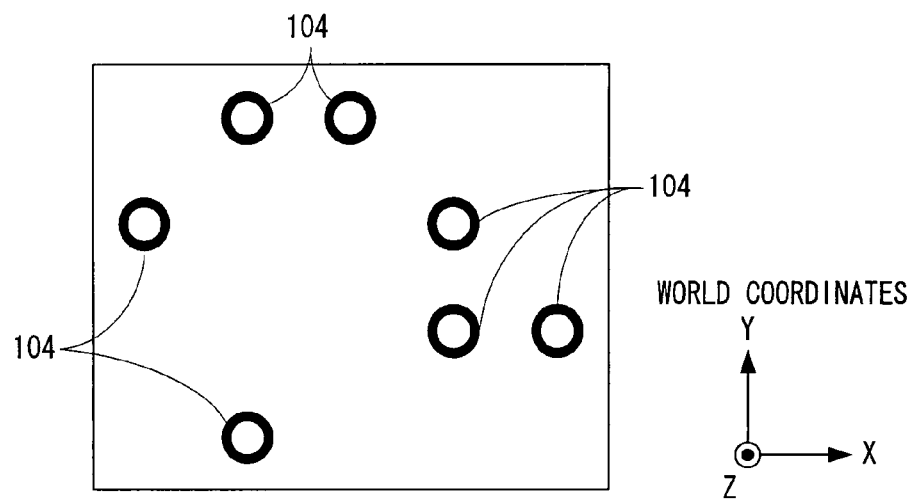
Figure 4:
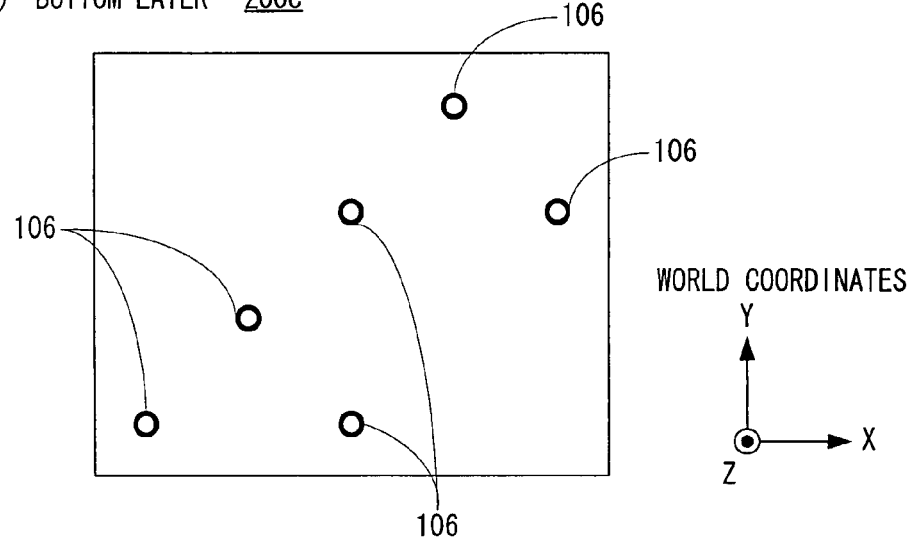

As shown in FIGS. 4(A), 4(B), and 4(C), large ring objects 102 are disposed on a top layer 200a, medium ring objects 104 are disposed on an intermediate layer 200b, and small ring objects 106 are disposed on a bottom layer 200c. The layers have the same size (area), are parallel to one another, and are disposed such that X and Y coordinates in world coordinates (coordinates in a three-dimensional game space) of reference points of the respective layers (e.g., the central points or upper-left vertices of the respective layers) match one another. Here, as shown in FIGS. 4(A) to 4(C), a lateral direction of each layer is an X-axis direction in world coordinates, a longitudinal direction of each layer is a Y-axis direction in world coordinates, and a direction vertical to the X- and Y-axes in world coordinates corresponds to a Z-axis in world coordinates. As shown in FIGS. 4(A) to 4(C), a right direction is a plus direction of the X-axis in world coordinates, an upward direction is a plus direction of the Y-axis in world coordinates, and an upward vertical direction relative to the drawing (paper) is a plus direction of the Z-axis in world coordinates. Note that a Z coordinate in world coordinates at which the top layer 200a is disposed is the maximum Z coordinate, a Z coordinate in world coordinates at which the bottom layer 200c is disposed is the minimum Z coordinate, and the intermediate layer 200b is disposed therebetween (see FIG. 7).

As can be seen by referring to FIGS. 4(A) to 4(C), the objects (102, 104, and 106) are disposed on the layers such that objects (102, 104, or 106) disposed on one layer do not overlap objects (102, 104, or 106) disposed on another layer. That is, a plurality of objects (102, 104, and 106) are not disposed at an identical location (X and Y coordinates) in an XY-plane. On the other hand, when attention is focused on the XY-plane, objects are always disposed on any of the layers. Specifically, as shown in FIG. 5, a plurality of square render areas (4×5) are set to each layer and thus a plurality of objects (102, 104, and 106) are not disposed in render areas at an identical location (with an identical index number) of different layers. For example, when a large ring object 102 is disposed in render area [1] of the top layer 200a, neither a medium ring object 104 nor a small ring object 106 is disposed in a render area [1] of the intermediate layer 200b or the bottom layer 200c. Similarly, when a medium ring object 104 is disposed in render area [2] of the intermediate layer 200b, neither a large ring object 102 nor a small ring object 106 is disposed in a render area [2] of the top layer 200a or the bottom layer 200c. Furthermore, when a small ring object 106 is disposed in a render area [4] of the bottom layer 200c, neither a large ring object 102 nor a medium ring object 104 is disposed in a render area [4] of the top layer 200a or the intermediate layer 200b. The same applies to other render areas. Since objects are always disposed in render areas of any of the layers, when viewed from a bird's eye perspective, it appears that the objects are disposed without any clearance therebetween.

Though not shown, objects (102, 104, and 106) are disposed such that the center coordinates in local coordinates (unique coordinates to objects for defining the shapes of the objects) of the objects (102, 104, and 106) are put at center coordinates of render areas of the layers.

Although in FIG. 5 the render areas are provided with index numbers, it is not necessarily limited thereto. As long as an identical index number is provided to render areas at an identical location of different layers, the alignment order of index numbers on the layers may be random.

Though not shown, at the beginning of a game screen 100 being displayed (updated), a virtual camera (viewpoint) 210 (see FIG. 7) is disposed on the side of the top layer 200a and the line of sight of the virtual camera 210 is set on a straight line passing through the centers of the respective layers (200a, 200b, and 200c) and being parallel to the Z-axis, so as to view the layers (200a, 200b, and 200c) from the front. Namely, when the initial screen 100 shown in FIG. 3 is displayed, the X and Y coordinates of a location (viewpoint) of the virtual camera 210 match the X and Y coordinates of the central locations of the respective layers and the X and Y coordinates of the point of gaze of the virtual camera 210 also match the X and Y coordinates of the central locations of the respective layers. Hence, the virtual camera 210 is set so as to view the layers (200a, 200b, and 200c) from a bird's eye perspective. Accordingly, the initial screen 100 such as the one shown in FIG. 3 is displayed. Hereinafter, to distinguish the game screen 100 such as the one shown in FIG. 3 from a game screen 100 (a three-dimensional viewpoint game screen 100) to be obtained when the layers are viewed from an angle due to the change of the viewpoint, the game screen 100 such as the one shown in FIG. 3 may be referred to as a "bird's eye viewpoint game screen 100". Note that the location (initial location) and the orientation (point of gaze) of the virtual camera 210 in a case of displaying a bird's eye viewpoint game screen 100 are set in advance.

Figure 6:
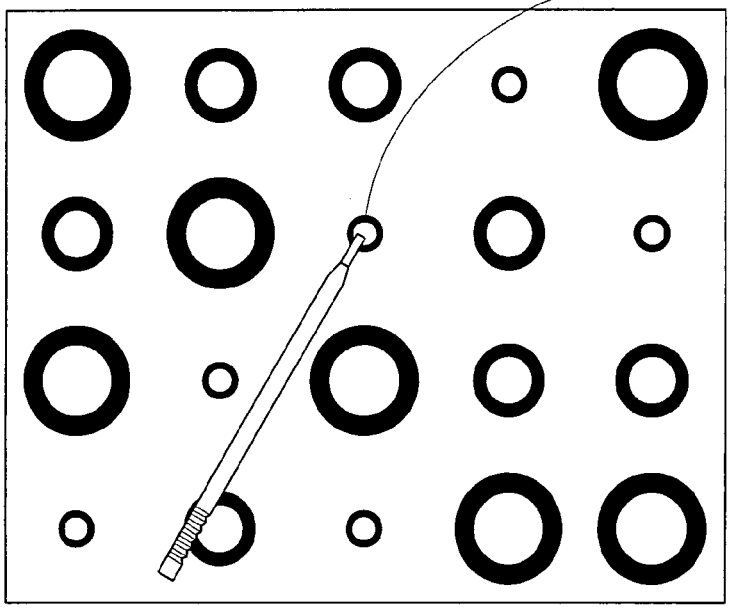
FIG. 6 is an illustrative view showing another examples of the game screen displayed on the second LCD of the game apparatus shown in FIG. 1.
Figure 6:
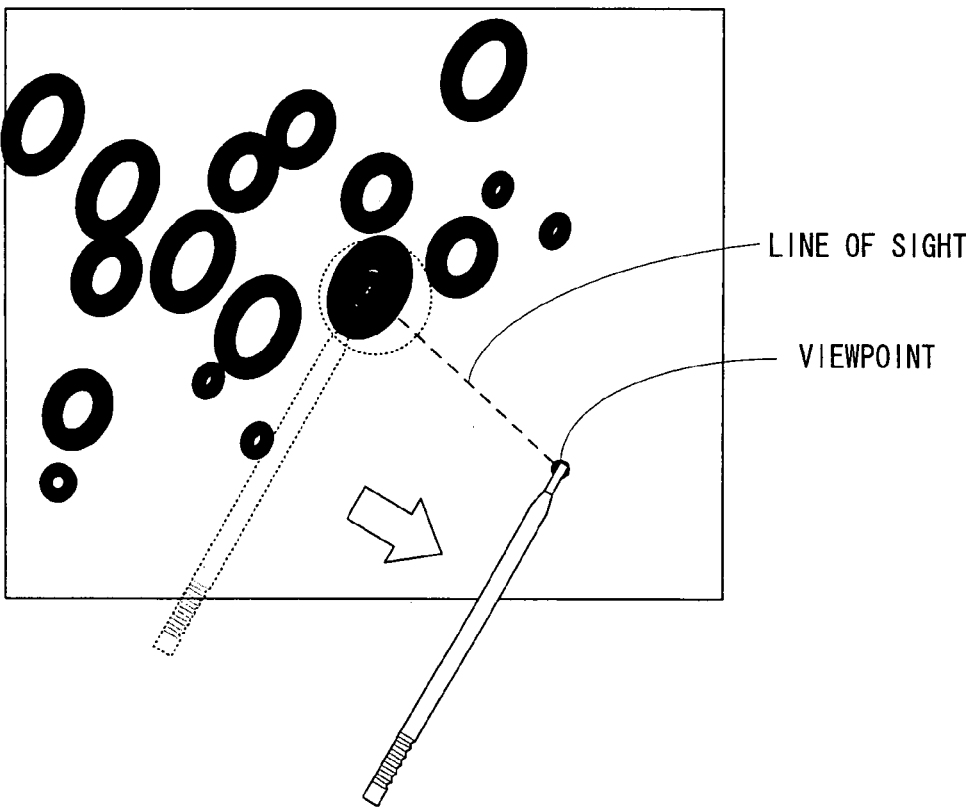

For example, as shown in FIG. 6(A), when a player touches (points to) a desired object (102, 104, or 106) by using a stick 26, the object (102, 104, or 106) is set as the point of gaze. Strictly speaking, location coordinates (center coordinates) in a world coordinate system of the object (102, 104, or 106) pointed to by the player are set as the point of gaze of the virtual camera 210. Although the present embodiment describes only a case where the point of gaze is set when a small ring object 106 is touched, the same applies to other objects (102 and 104). Subsequently, as shown in FIG. 6(B), when the player slides the stick 26, the location of the virtual camera 210 is moved according to the slide operation. That is, the viewpoint is moved. Note that the point of gaze of the virtual camera 210 is fixed to the location coordinates of the small ring object 106 having been pointed to by the player. Though not shown, the length of the line of sight of the virtual camera 210 (the distance between the viewpoint and the point of gaze) is fixed to a straight line distance (hereinafter, referred to as the "distance q") between the initial location of the virtual camera 210 and the bottom layer 200c, and thus, the virtual camera 210 moves in the three-dimensional virtual space along a spherical surface whose radius is the distance q.

Figure 7:
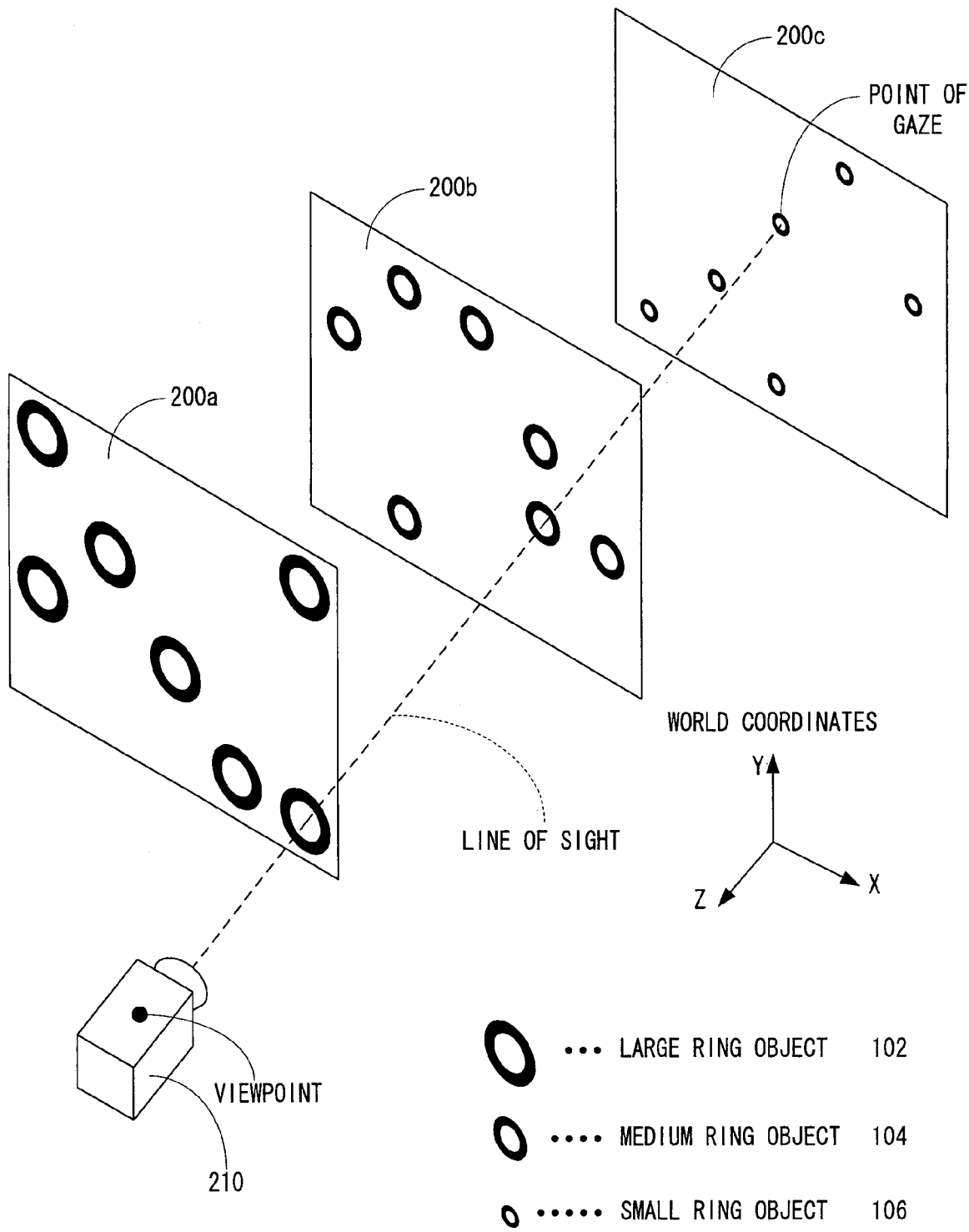
FIG. 7 is an illustrative view showing a positional relationship in the three-dimensional virtual space between the respective layers and a virtual camera.

In this puzzle game, the virtual camera 210 is moved by the player and when a plurality of objects (102, 104, and 106) intersecting the line of sight of the virtual camera 210 or a straight line parallel to the line of sight satisfy a predetermined condition, the plurality of objects (102, 104, or 106) are deleted. In the present embodiment, as shown in FIG. 7, when, upon determination of the viewpoint of the virtual camera 210, objects (102, 104, and 106) intersect the line of sight or a straight line parallel to the line of sight in the order of a large ring object 102, a medium ring object 104, and a small ring object 106 from the side of the virtual camera 210 (viewpoint side) to the point-of-gaze side, it is determined that the predetermined condition (deletion condition) is satisfied. At this time, the large ring object 102, the medium ring object 104, and the small ring object 106 overlap one another. Note that, in the present embodiment, when a medium ring object 104 is displayed in a large ring object 102 and furthermore a small ring object 106 is displayed in the medium ring object 104, it indicates that the objects (102, 104, and 106) overlap one another in the order of the large ring object 102, the medium ring object 104, and the small ring object 106 from the side of the virtual camera 210. Therefore, though it is difficult to see in FIG. 6(B), when objects (102, 104, and 106) overlap one another according to the above-described order, on the game screen 100 the objects are displayed such that a tunnel is formed by a large ring object 102, a medium ring object 104, and a small ring object 106, such as a portion encircled by a dot circle.

Figure 8:
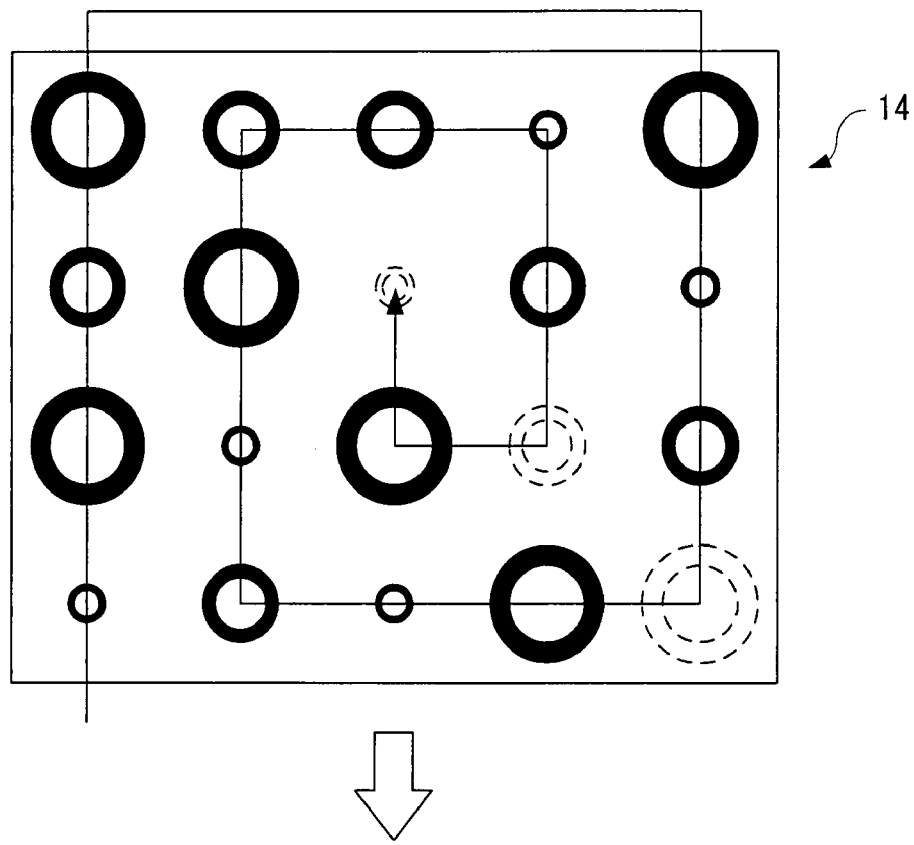
FIG. 8 is an illustrative view for describing a method of updating a game screen displayed on the second LCD of the game apparatus shown in FIG. 1.
Figure 8:
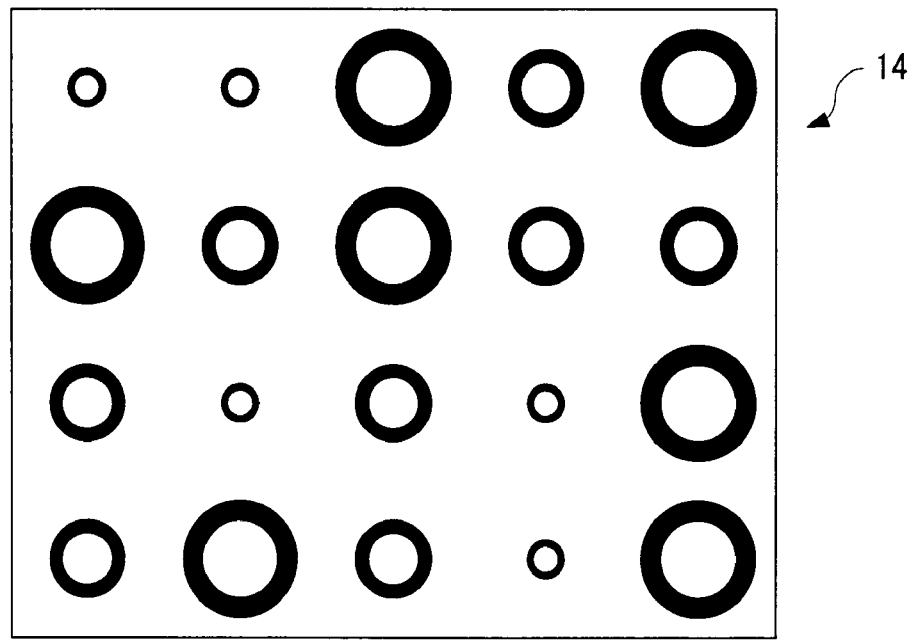

Then, the objects (102, 104, and 106) having satisfied the deletion condition are deleted from the three-dimensional virtual space. Therefore, as shown in FIG. 8(A), a game screen 100 on which some objects (102, 104, and 106) are deleted is displayed. Thereafter, objects (102, 104, and 106) are slid (moved) over spirally (clockwise) and objects (102, 104, and/or 106) of arbitrary sizes and of the same number as the number (three) of the deleted objects (102, 104, and 106) are added. Hence, as shown in FIG. 8(B), the game screen 100 is updated.

In the puzzle game of the present embodiment, when, for example, at least a predetermined number of objects (102, 104, and 106) are deleted within a first certain period of time (e.g., three minutes), the game is cleared. On the other hand, when the predetermined number of objects (102, 104, and 106) are not deleted within the first certain period of time, the game is over. Note that the game clear condition and the game over condition are not necessarily limited thereto and a game developer or designer can arbitrary set such conditions.

Though not shown, even when objects (102, 104, and 106) are not deleted, the game screen 100 is updated. This is to avoid a deadlock situation where objects (102, 104, and 106) cannot be deleted. Specifically, when the player does not perform any operation after a game is started or a game screen 100 is updated and a second certain period of time (e.g., one minute) shorter than the first certain period of time has elapsed, the game screen 100 is updated. For example, a single or a plurality of objects (102, 104, and/or 106) displayed at the center or near the center of the game screen 100 (or at a random location) is (are) deleted, objects (102, 104, and 106) remained without being deleted are slid over spirally, and an arbitrary object (s) (102, 104, and/or 106) of the same number as the number of the deleted object (s) (102, 104, and/or 106) is (are) added.

Figure 9:
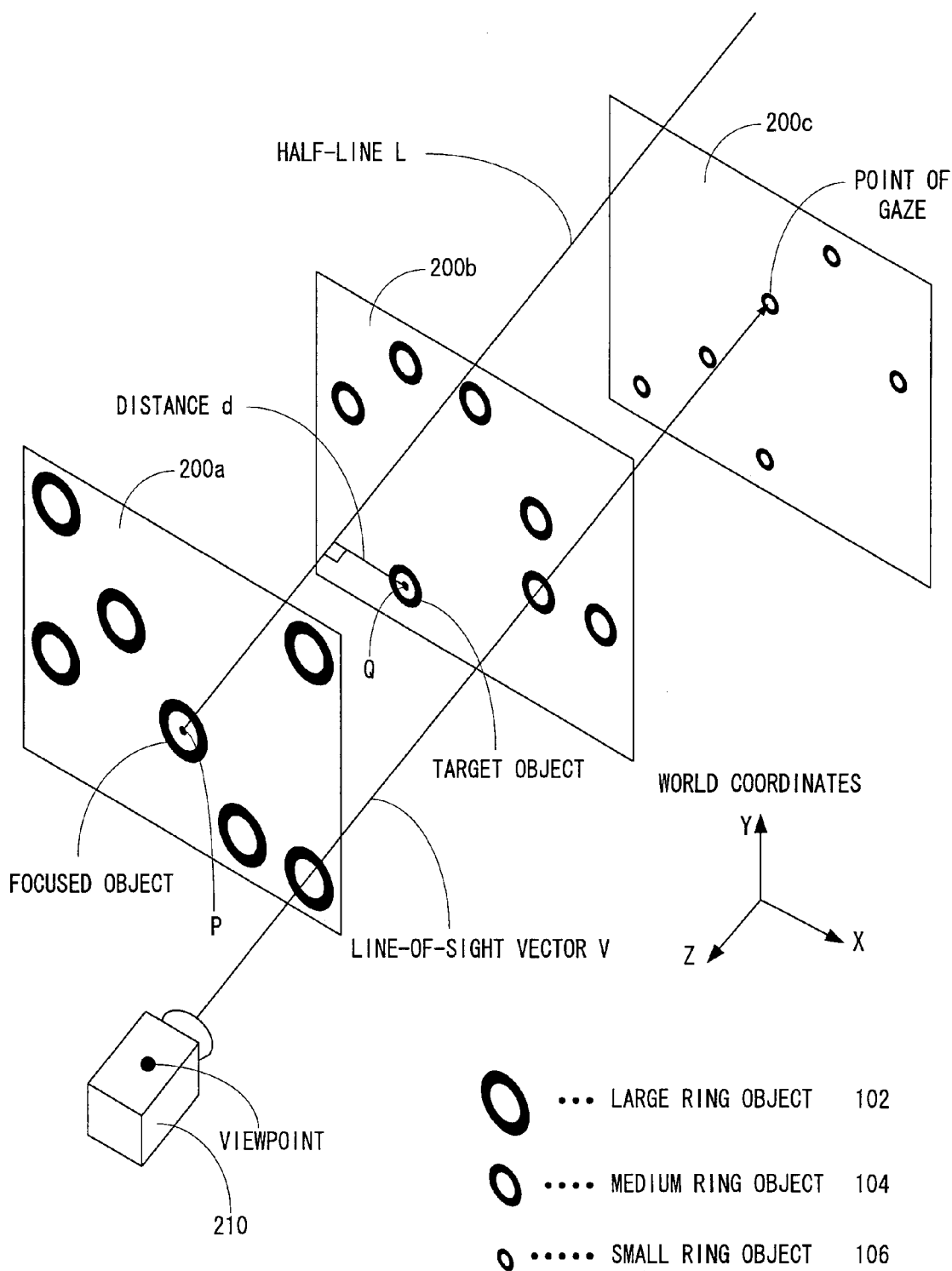
FIG. 9 is an illustrative view for describing an overlap determination method for determining whether or not objects on the respective layers overlap one another in the three-dimensional virtual space.

Now, a method of determining (overlap determination) whether or not a large ring object 102, a medium ring object 104, and a small ring object 106 overlap one another in this order will be described. As shown in FIG. 9, in overlap determination, first, a vector of the line of sight (line-of-sight vector) V is calculated and then a half-line L parallel to the line-of-sight vector V and originating at location coordinates P of an object to be focused (focused object) is calculated. Here, the focused object indicates a large ring object 108 rendered (disposed) in a given render area of the top layer 200a. The line-of-sight vector V is a vector originating at the coordinates of the viewpoint and terminating at the coordinates of the point of gaze, and is determined by subtracting the coordinates of the viewpoint from the coordinates of the point of gaze. The half-line L (vector) is determined by adding the location coordinates P of the focused object to the line-of-sight vector V.

Figure 10:
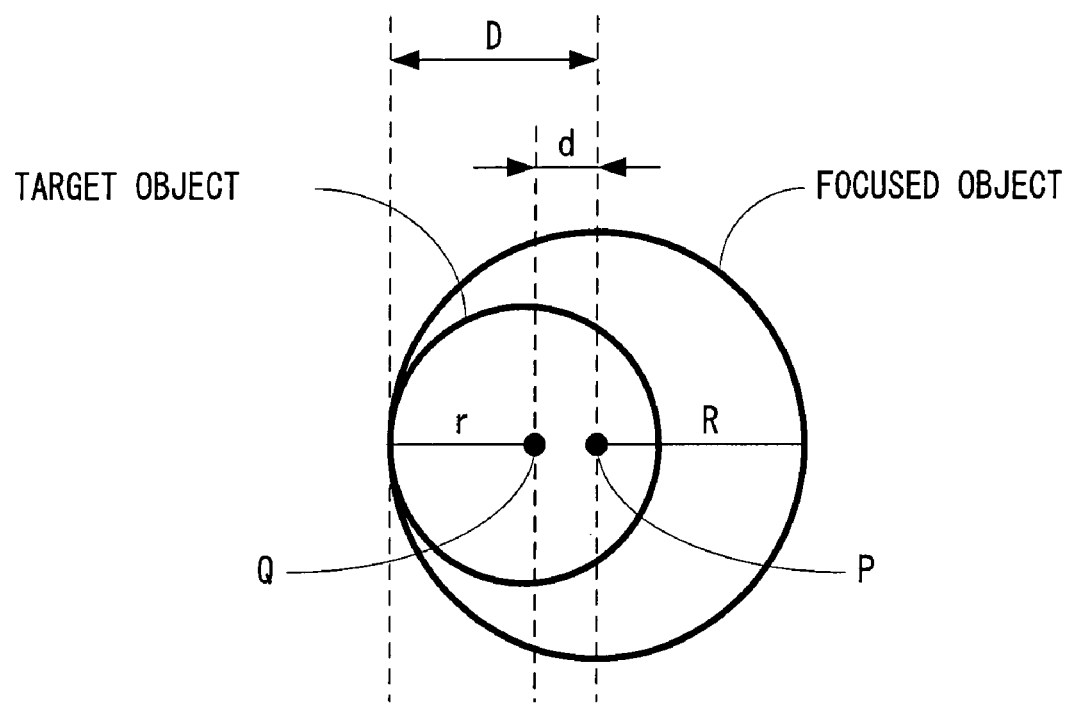
FIG. 10 is an illustrative view for describing a condition where the objects overlap one another in the overlap determination.

Then, a distance d between a location Q of an object (target object) as the target for determining whether or not it overlaps the object to be focused and the half-line L is calculated. In the present embodiment, the target object indicates a medium ring object 104 disposed in a given render area of the intermediate layer 200b or a small ring object 106 rendered (disposed) in a given render area of the bottom layer 200c. FIG. 9 shows a case where a medium ring object 104 is the target object. Here, as shown in FIG. 10, it can be seen that for the target object to overlap the focused object, a length (distance) D obtained by adding a radius r of the target object (a medium ring object 104 in FIG. 9) to the distance d should be less than or equal to a radium R of the focused object (a large ring object 102 in the present embodiment). Therefore, in a case such as the one shown in FIG. 9, it is obvious that the distance d exceeds the radius R of the focused object and thus it is determined that the target object does not overlap the focused object.

The overlap determination is performed on each render area. In the present embodiment, a process for overlap determination (overlap determination process) is performed according to the index numbers shown in FIG. 5. For example, on the top layer 200a, whether or not a large ring object 102 is rendered in a render area is determined in order from index number 1. When a large ring object 102 is not rendered in a given render area of the top layer 200a, without performing an overlap determination process, it is determined whether or not a large ring object 102 is rendered in a render area with a subsequent index number. On the other hand, when a large ring object 102 is rendered in the given render area of the top layer 200a, an overlap determination process is performed using the large ring object 102 as a focused object. In the overlap determination process, it is determined whether or not a medium ring object 104 rendered on the intermediate layer 200b or a small ring object 106 rendered on the bottom layer 200c serving as a target object overlaps the focused object. On the intermediate layer 200b and the bottom layer 200c, whether or not objects (104 and 106) are rendered is determined according to the order of the index numbers and whether or not rendered objects (104 and 106), i.e., target objects, overlap the focused object is determined. Such an overlap determination process is performed on all render areas (index numbers 1 to 20) of the intermediate layer 200b and the bottom layer 200c. When an overlap determination process for one focused object ends, an overlap determination process is performed on a subsequent focused object and an overlap determination process is performed on all render areas (index numbers 1 to 20) of the top layer 200a.

Note that, as described above, a plurality of objects (102, 104, and 106) are not rendered in render areas with an identical index number of different layers, and thus, an overlap determination process is not performed on a render area where a focused object (a large ring object 102) is rendered. For the same reason, when a target object (a medium ring object 104) is rendered in a render area of the intermediate layer 200b, an overlap determination process is not performed on a corresponding render area of the bottom layer 200c. In contrast, when a target object (a small ring object 106) is rendered in a render area of the bottom layer 200c, an overlap determination process is not performed on a corresponding render area of the intermediate layer 200b. By thus cutting out unnecessary processes, the load of overlap determination processes is reduced.

Figure 11:
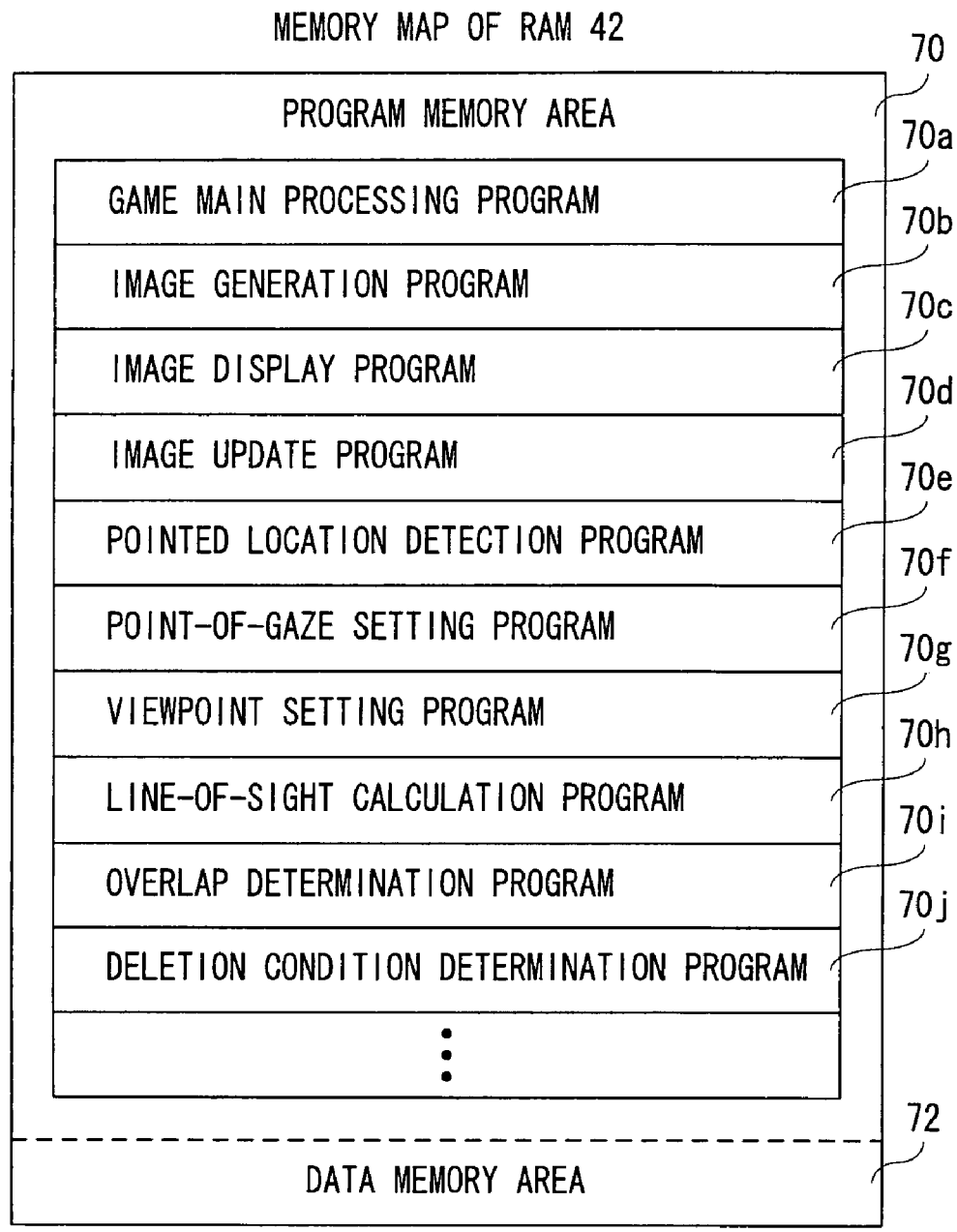
FIG. 11 is an illustrative view showing an example of a memory map of a RAM shown in FIG. 2.

FIG. 11 is an illustrative view showing an example of a memory map of the RAM 42 shown in FIG. 2. Referring to FIG. 11, the RAM 42 includes a program memory area 70 and a data memory area 72. The program memory area 70 stores therein a game program. The game program is constituted by a game main processing program 70a, an image generation program 70b, an image display program 70c, an image update program 70d, a pointed location detection program 70e, a point-of-gaze setting program 70f, a viewpoint setting program 70g, a line-of-sight calculation program 70h, an overlap determination program 70i, a deletion condition determination program 70j, and the like.

The game main processing program 70a is a program for processing a main routine of a puzzle game of the present embodiment. The image generation program 70b is a program for generating a game image using object disposition data 72d and image data 72h, as will be described later. Specifically, first, a top layer 200a, an intermediate layer 200b, and a bottom layer 200c are disposed in the three-dimensional virtual space (world coordinates) so as to be aligned in a direction orthogonal to the Z-axis direction in the three-dimensional virtual space. Then, objects (102, 104, and 106) are rendered on the layers such that a plurality of objects (102, 104, and 106) are not rendered in render areas at an identical location (with an identical index number) of the different layers. The total number of objects (102, 104, and 106) to be rendered matches the total number (20 in the present embodiment) of render areas. Though not shown, a game image for another game screen to be displayed on the LCD 12 is also generated. For example, on another game screen is displayed information on player's score, level, or the like.

The image display program 70c is a program for displaying, as a game screen, a game image generated by the image generation program 70b, on the LCD 12 or the LCD 14. A game screen 100 to be displayed on the LCD 14 is a game image when viewing the point of gaze indicated by point-of-gaze location data 72b, as will be described later, from a viewpoint location indicated by viewpoint location data 72c, as will be described later. The image update program 70d is a program for updating a game image. As described above, when objects (102, 104, and 106) are deleted by a player's operation or when a period of time during which the player does not perform any operation exceeds the second certain period of time, a game image is updated. Thus, the display of the game screen 100 is changed.

The pointed location detection program 70e is a program for detecting a pointed location on the LCD 14 based on coordinate data from the touch panel 24. The pointed location detection program 70e stores (temporarily stores) in an operation data buffer 72a, as will be described later, coordinate data detected frame by frame (a frame: a unit of time for screen update (1/60 second)) during a period of time from when the player starts a touch on the touch panel 24 (start of touch) until the player ends the touch (end of touch). As described above, in the present embodiment, the resolution of the LCD 14 is made to be the same as the detection accuracy of the touch panel 24, and thus, by setting the same coordinate system for the LCD 14 and the touch panel 24, coordinate data on a touch location inputted from the touch panel 24 can be directly used as coordinate data on a pointed location (on a game screen 100) on the LCD 14.

The point-of-gaze setting program 70f is a program for setting the location coordinates in world coordinates of an object (102, 104, or 106) to be displayed at coordinates indicated by coordinate data on a touch start location detected by the pointed location detection program 70e, as the point of gaze. Upon the start of a game or the update of a game image (game screen 100), the point of gaze is set to the central location of the bottom layer 200c (or the top layer 200a or the intermediate layer 200b). The viewpoint setting program 70g is a program for setting the location coordinates in world coordinates of the virtual camera 210 (viewpoint) according to coordinate data on a touch location detected by the pointed location detection program 70e. In the present embodiment, the viewpoint setting program 70g determines X and Y coordinates in world coordinates corresponding to two-dimensional location coordinates (X and Y coordinates) indicated by coordinate data inputted from the touch panel 24. For example, by setting the origin of the coordinate system of the LCD 14, the origin of the coordinate system of the touch panel 24, and the origin of the coordinate system (an XY-plane only) of each layer to the same point (e.g., an upper-left vertex), X and Y coordinates indicated by coordinate data inputted from the touch panel 24 can be used as X and Y coordinates in world coordinates. Then, a Z coordinate is determined such that the length of the line of sight becomes the distance q. Accordingly, the location coordinates of the virtual camera 210 are determined. Note that upon the start of a game or the update of a game screen 100, the viewpoint is set to an initial location. At this time, as described above, the point of gaze is the central location of the bottom layer 200c.

The line-of-sight calculation program 70h is a program for calculating a line-of-sight vector V originating at the location coordinates of a viewpoint indicated by the viewpoint location data 72c and terminating at the location coordinates of the point of gaze indicated by the point-of-gaze location data 72b. The overlap determination program 70i is a program for determining by using the line-of-sight vector V calculated according to the line-of-sight calculation program 70h whether or not target objects (104 and 106) overlap a focused object (102). In other words, the overlap determination program 70i determines whether or not the line of sight or a straight line parallel to the line of sight intersects objects (102, 104, and 106).

The deletion condition determination program 70j is a program for determining whether or not objects (102, 104, and 106) determined to overlap one another according to the overlap determination program 70i satisfy the deletion condition. In the present embodiment, the deletion condition is satisfied when a large ring object 102, a medium ring object 104, and a small ring object 106 overlap one another in order from the viewpoint side to the point-of-gaze size. The deletion condition is not satisfied otherwise.

Though not shown, the game program also includes a sound output program, a backup program, and the like. The sound output program is a program for outputting sound necessary for a game, such as the voice of a game character, sound effects, and music (BGM). The backup program is a program for saving game data (proceeding data or result data) on the memory card 30 according to an instruction from the player or a game event.

Figure 12:
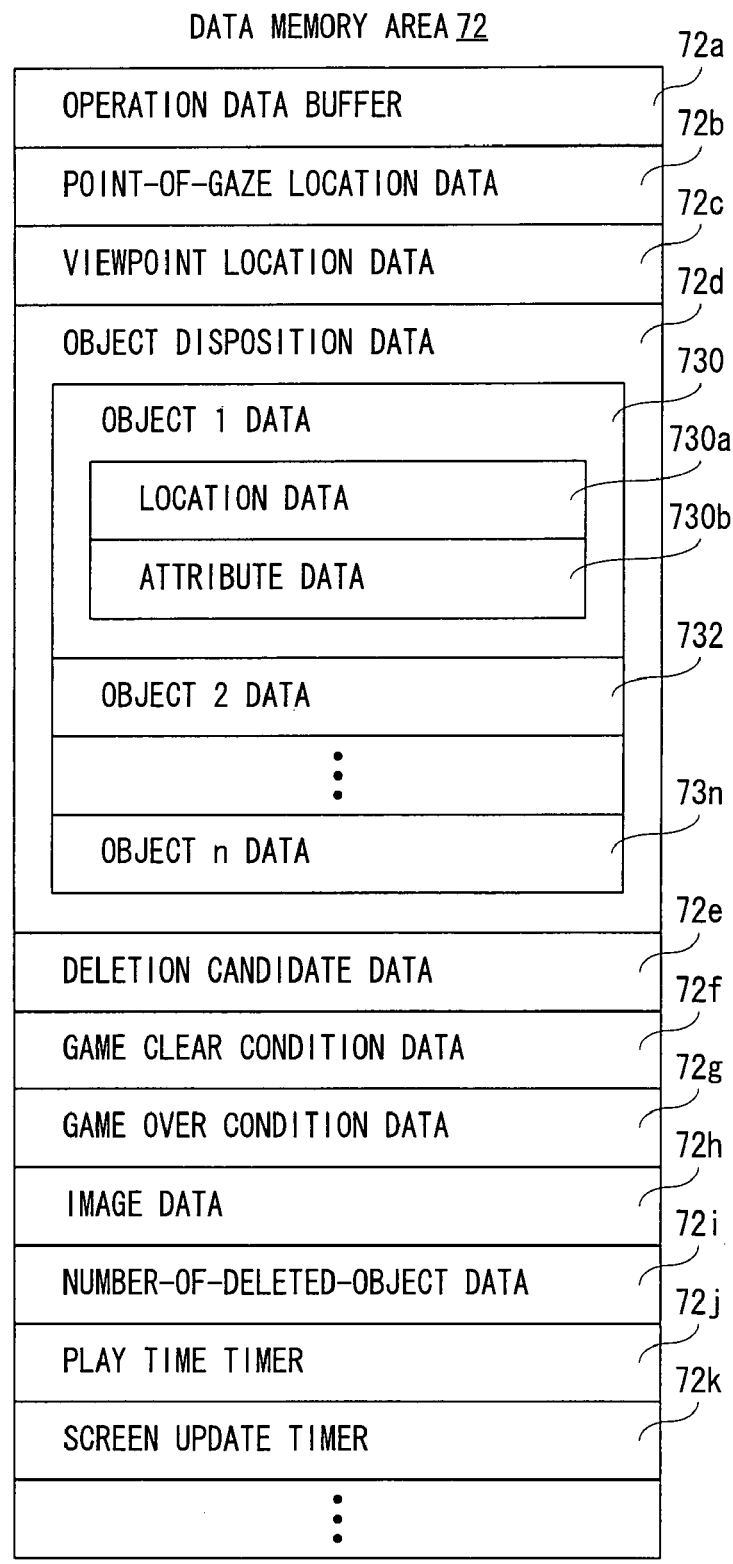
FIG. 12 is an illustrative view showing specific contents in a data memory area shown in FIG. 11.

FIG. 12 is an illustrative view showing an example of contents of the data memory area 72 shown in FIG. 11. Referring to FIG. 12, in the data memory area 72 is provided the operation data buffer 72a. The data memory area 72 stores therein point-of-gaze location data 72b, viewpoint location data 72c, object disposition data 72d, deletion candidate data 72e, game clear condition data 72f, game over condition data 72g, image data 72h, and number-of-deleted-object data 72i. In the data memory area 72 are further provided a screen update timer 72k and a play time timer 72j.

The operation data buffer 72a is, as described above, an area for temporarily storing coordinate data detected according to the pointed location detection program 70e. The point-of-gaze location data 72b is coordinate data on the location coordinates of the point of gaze in the three-dimensional virtual space. The viewpoint location data 72c is coordinate data on the location coordinates of a viewpoint, i.e., the virtual camera 210, in the three-dimensional virtual space.

The object disposition data 72d is data for disposing objects (102, 104, and 106) and includes object 1 data 730, object 2 data 732 . . . , object n data 73n. The object 1 data 730 includes location data 730a and attribute data 730b. The location data 730a is coordinate data on location coordinates (X and Y coordinates) on a layer where the object 1 is disposed. The attribute data 730b is data on the type of the object 1 (a large ring object 102, a medium ring object 104, or a small ring object 106, or the size (radius)), the type of a layer where the object 1 is disposed (a top layer 200a, an intermediate layer 200b, or a bottom layer 200c), and a disposition location (index number) of the object 1. In the present embodiment, the object 1 indicates an object (102, 104, or 106) rendered for index number "1". That is, the numerical value n in the drawing indicates an index number (n=1, 2, 3 . . . , 20).

Though a detailed description is not given herein, the same applies to other object data, i.e., the object 2 data 732 . . . , the object n data 73n.

The deletion candidate data 72e is data on a deletion candidate object (102, 104, or 106). In the present embodiment, data in which identification information (e.g., a pointer of the object 1 data 730 . . . , the object n data 72n; the same applies hereinafter) of a target object (104 or 106) determined to overlap a focused object (102) is associated with identification information of the focused object is stored as deletion candidate data 72e.

The game clear condition data 72*f* is a condition for determining whether or not a game is cleared. In the present embodiment, the game clear condition is that at least the predetermined number of objects (102, 104, and 106) are deleted within the first certain period of time (three minutes). The game over condition data 72*g* is a condition for determining whether or not a game is over. In the present embodiment, the game over condition is that the predetermined number of objects (102, 104, and 106) are not deleted within the first certain period of time. The image data 72*h* is polygon data, texture data, and the like, for generating a game image. The number-of-deleted-object data 72*j* is numerical value data indicating the number (number k of deletions) of objects (102, 104, and 106) deleted while the first certain period of time (three minute) is counted by the play time timer 72*j*, as will be described later.

Note that the game clear condition and the game over condition are merely examples and thus are not necessarily limited thereto. Such conditions are appropriately set by a game developer or designer. In addition, the conditions do not need to be fixed and may be appropriately changed according to the level of a game (or a player) or the like.

The play time timer 72*j* is a timer for counting time (the first certain period of time) spent by the player playing a puzzle game. The play time timer 72*j* is reset and started upon the start of a game. The screen update timer 72*k* is a timer for counting a screen update time (the second certain period of time (one minute)). The screen update timer 72*k* is reset and started upon the start of a game or the update of a game screen 100.

Though not shown, in the data memory area 72 are stored sound data, game data, and the like, and is provided another timer (counter) necessary for game processing, a register, a flag, or the like.

Figure 13:
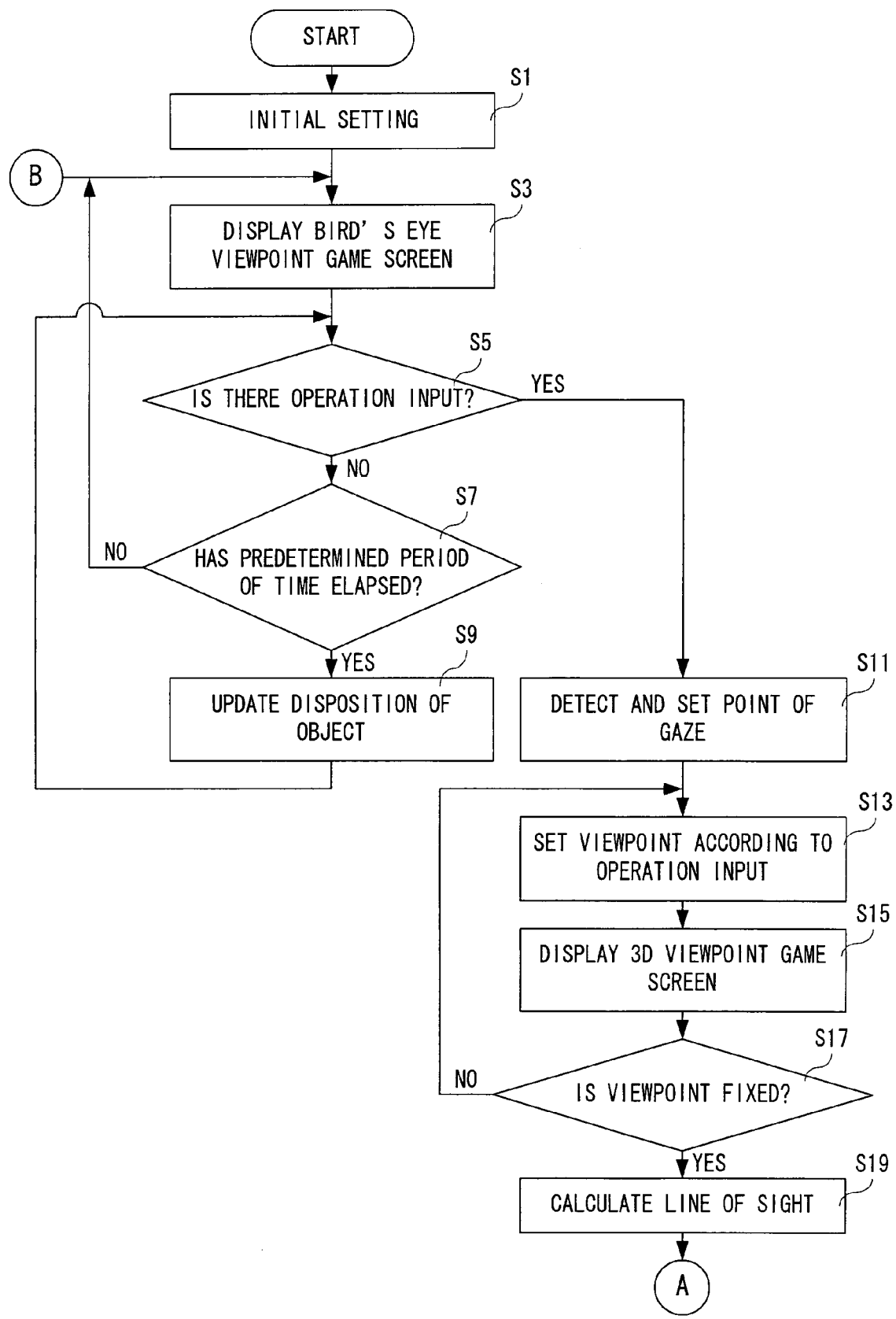
FIG. 13 is a flowchart showing a part of overall game processing of a CPU core shown in FIG. 2.

Specifically, the CPU core 34 shown in FIG. 2 performs overall game processing (main routine) according to flowcharts shown in FIGS. 13 to 16. As shown in FIG. 13, when the CPU core 34 starts the overall game processing, in a step S1, the CPU core 34 performs an initial setting. Here, for example, a buffer such as the operation data buffer 72*a* is cleared and timers (counters), such as the play time timer 72*j* and the screen update timer 72*k*, the register, the flag, or the like is reset. Though not shown, here, the number-of-deleted-object data 72*i* is reset (the number k of deletions=0). Similarly, though not shown, the play time timer 72*j* and the screen update timer 72*k* are started after being reset. Furthermore, an initial value of the object disposition data 72*d* for displaying a game screen 100 (initial screen) is set. Note that when a game starts from a previous game, values according to game data stored on the memory card 30 are set to the register and the flag.

In a subsequent step S3, a bird's eye viewpoint game screen 100 (initial screen), such as the one shown in FIG. 3, is displayed. Then, in a step S5, it is determined whether or not there is an operation input. That is, it is determined whether or not coordinate data is inputted form the touch panel 24. Note that the process in the step S5 is to determine whether or not the player has started a touch. If "NO" in the step S5, i.e., if there is no operation input, then, in a step S7 it is determined by referring to a count value of the screen update timer 72*k* whether or not the second certain period of time (one minute) has elapsed.

If "NO" in the step S7, i.e., if the second certain period of time has not elapsed, then the processing returns to the step S3. On the other hand, if "YES" in the step S7, i.e., if the second certain period of time has elapsed, then in a step S9 the disposition of objects (102, 104, and 106) is updated and the processing returns to the step S5. That is, by the process in the step S9, a game image (the game screen 100) is updated. Though not shown, after performing the process in the step S9, the screen update timer 72*k* is reset and started.

If "YES" in the step S5, i.e., if there is an operation input, then in a step S11 the point of gaze is detected and set. In the present embodiment, the location coordinates of an object (102, 104, or 106) indicated by a touch start location are set as the point of gaze and coordinate data on the location coordinates of the point of gaze is stored in the data memory area 72 as point-of-gaze location data 72*b*. Subsequently, in a step S13, a viewpoint is set according to an operation input. Here, coordinate data inputted from the touch panel 24 is sequentially stored in the operation data buffer 72*a*, and as described above, a pointed location in the three-dimensional virtual space (game space) corresponding to a touch location (location coordinates) indicated by the coordinate data is calculated and the pointed location is set as the location coordinates of the viewpoint. That is, the coordinate data on the location coordinates of the pointed location in the three-dimensional virtual space is stored in the data memory area 72 as viewpoint location data 72*c*. Thus, when the touch location is changed, the viewpoint (viewpoint location data 72*c*) is also updated.

In a subsequent step S15, a 3D viewpoint game screen 100, such as the one shown in FIG. 6(B), is displayed. That is, the virtual camera 210 is disposed at (moved to) the location of the viewpoint (the virtual camera 210) indicated by the viewpoint location data 72*c* with the orientation of the virtual camera 210 being set to the direction of the point of gaze indicated by the point-of-gaze location data 72*b*. Then, a scene in the three-dimensional virtual space shot by the virtual camera 210 is displayed on a two-dimensional game screen 100. That is, a three-dimensional game image as viewed from the virtual camera 210 is projected and transformed (projected onto a virtual screen) and a projected and transformed two-dimensional game image is displayed as a game screen 100.

Subsequently, in a step S17, it is determined whether or not the viewpoint is fixed. That is, it is determined whether or not the touch has ended. When there is no more coordinate data from the touch panel 24, it is determined that the touch has ended. If "NO" in the step S17, i.e., if the viewpoint is not fixed, then it is determined that the viewpoint is being changed and thus the processing returns to the step S13. On the other hand, if "YES" in the step S17, i.e., the viewpoint is fixed, then in a step S19 the line of sight is calculated. Here, the CPU core 34 calculates a line-of-sight vector V originating at the location coordinates of the viewpoint and terminating at the location coordinates of the point of gaze, by referring to the point-of-gaze location data 72*b* and the viewpoint location data 72*c*.

Figure 14:
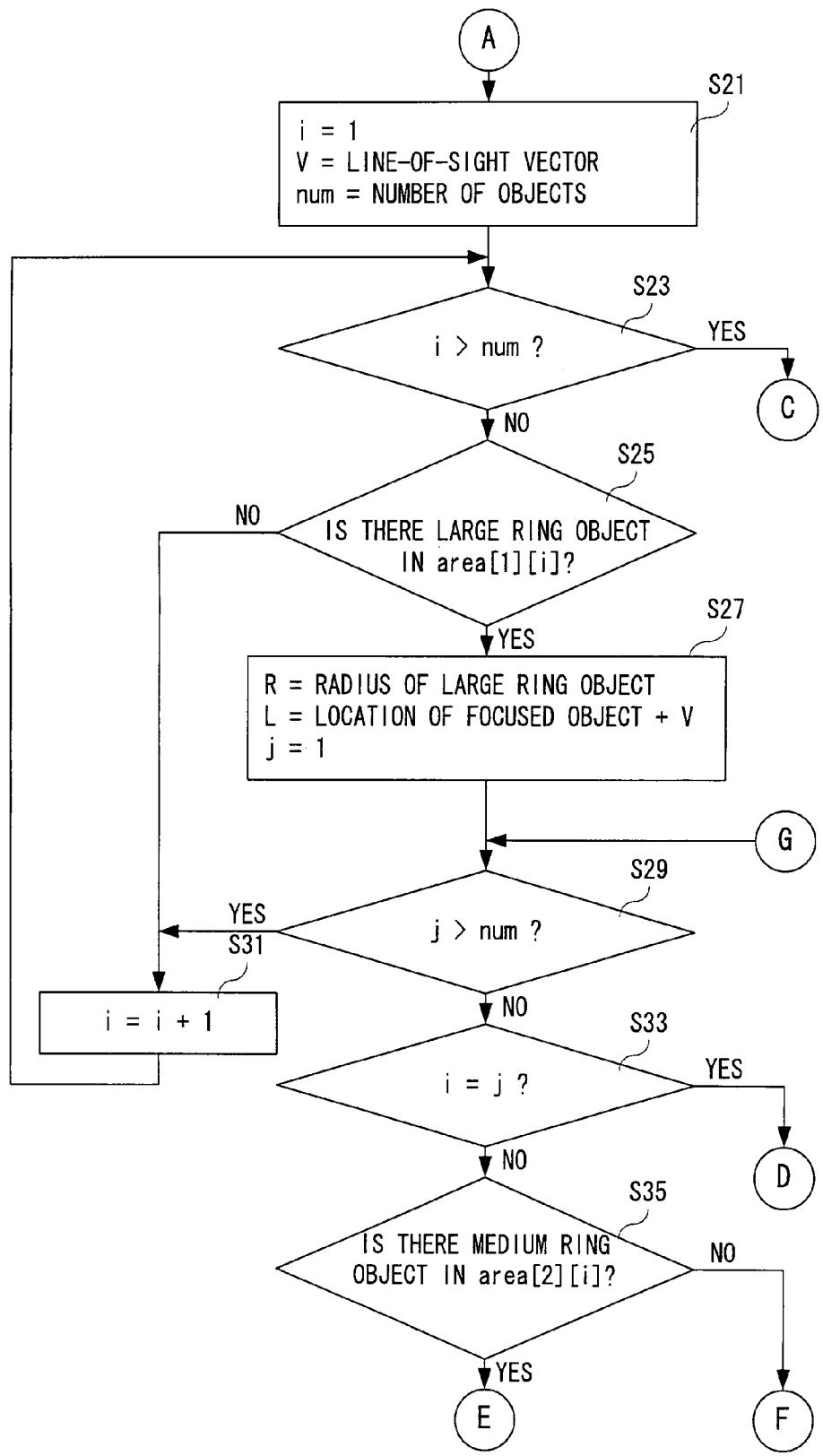
FIG. 14 is a flowchart showing another part of the overall game processing of the CPU core shown in FIG. 2 and being subsequent to the flowchart of FIG. 13.

As shown in FIG. 14, in a subsequent step S21, an initial value is set to a variable i (i=1), the line-of-sight vector V is set to a variable V, and the total number (20) of objects (102, 104, and 106) is set to a variable num. Here, the variable i corresponds to an index number of a render area of the top layer 200*a*. In the present embodiment, a render area of the top layer 200*a* is represented by area [1][i]. As will be described later, a render area of the intermediate layer 200*b* is represented by area [2][j] and a render area of the bottom layer 200*c* is represented by area [3][j].

Subsequently, in a step S23, it is determined whether or not the variable i is greater than the variable num. That is, it is determined whether or not an overlap determination process has ended. If "YES" in the step S23, i.e., if the variable i is greater than the variable num, then it is determined that the overlap determination process has ended and thus the processing proceeds to a step S55 shown in FIG. 16.

If "NO" in the step S23, i.e., if the variable i is less than or equal to the variable num, then it is determined that the overlap determination process has not ended, and thus, in a step S25 it is determined whether or not a large ring object 102 is rendered in a render area of area [1][i]. Here, the CPU core 34 performs the determination process by referring to attribute data included in the object 1 data 730 to the object n data 73n. Hereinafter, determination on objects (102, 104, and 106) rendered in render areas is made in the same manner as the above.

If "NO" in the step S25, i.e., if a large ring object 102 is not rendered in the render area of area [1][i], then the processing proceeds to a step S31 to perform an overlap determination process on a subsequent render area of area [1][i]. That is, if a large ring object 102 is not rendered in the render area of area [1][i]; an overlap determination process is not performed on this render area of area [1][i]. By this, the calculation load of the CPU core 34 is reduced.

On the other hand, if "YES" in the step S25, i.e., if a large ring object 102 is rendered in the render area of area [1][i], then in a step S27 a radius of the large ring object 102 is set to a variable R, a half-line L being moved such that the origin of the line-of-sight vector V matches the location coordinates of the large ring object 102 (focused object) rendered in the render area of area [1][i] is set (L=the location of the focused object+V), and an initial value is set to a variable j (j=1).

In a subsequent step S29, it is determined whether or not the variable j is greater than the variable num. That is, it is determined whether or not overlap determination processes on all of render areas of area [2][j] and render areas of area [3][j] have ended. If "YES" in the step S29, i.e., if the variable j is greater than the variable num, then it is determined that the overlap determination processes on all of the render areas of area [2][j] and the render areas of area [3][j] have ended, and thus, in order to perform an overlap determination process on a subsequent render area of area [1] [i], in the step S31 the variable i is incremented (i=i+1) and the processing returns to the step S23.

If "NO" in the step S29, i.e., if the variable j is less than or equal to the variable num, then it is determined that the overlap determination processes on all of the render areas of area [2][j] and the render areas of area [3][j] have not ended, and thus, in a step S33 it is determined whether or not the variable i is equal to the variable j. This determination is made so as not to perform an overlap determination process on render areas of the intermediate layer 200b and the bottom layer 200c at the same location (with the same index number) as a render area where a large ring object 102 as a focused object is rendered.

Figure 15:
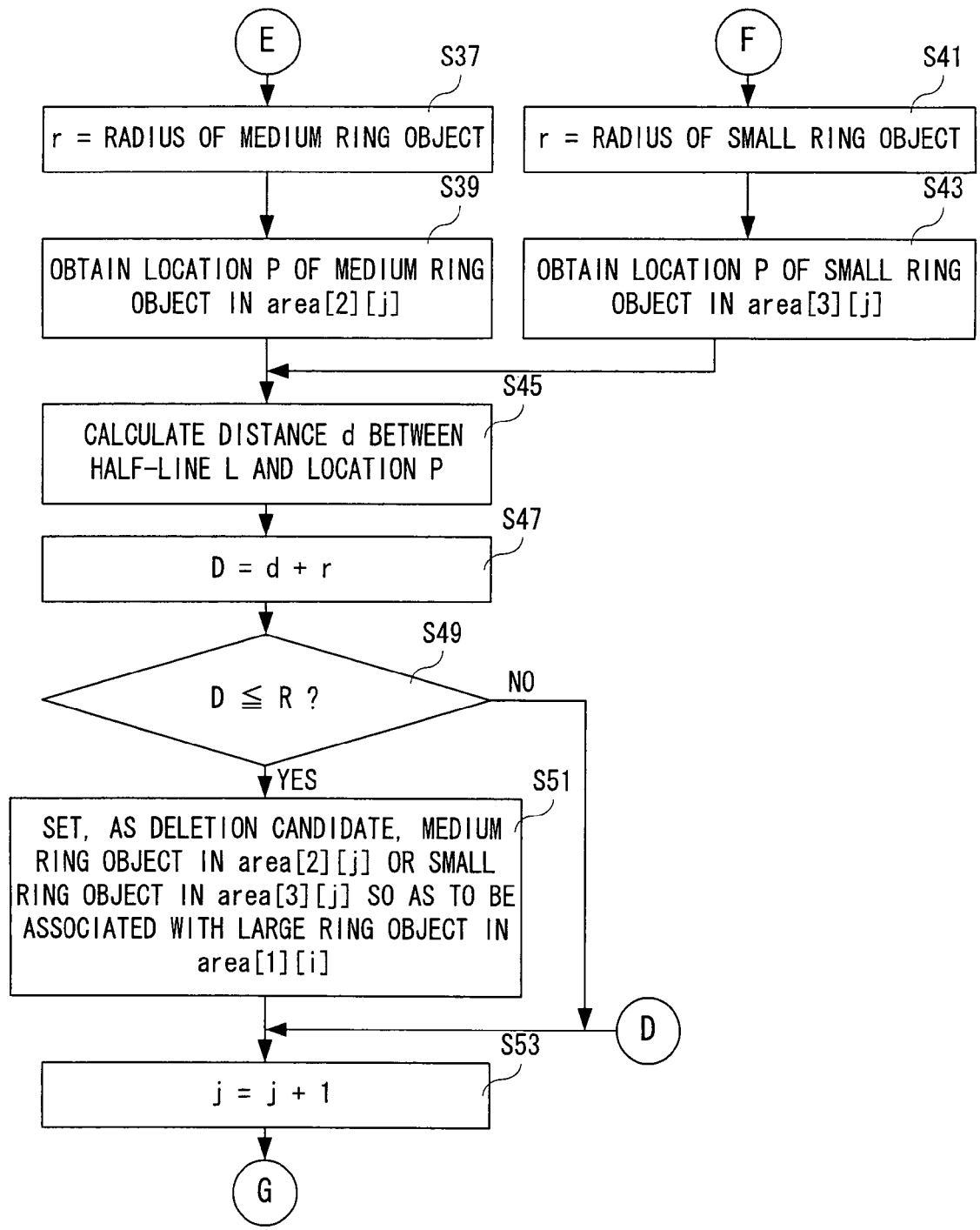
FIG. 15 is a flowchart showing still another part of the overall game processing of the CPU core shown in FIG. 2 and being subsequent to the flowcharts of FIGS. 13 and 14.

If "YES" in the step S33, i.e., if the variable i is equal to the variable j, then the processing proceeds to a step S53 shown in FIG. 15. On the other hand, if "NO" in the step S33, i.e., if the variable i is not equal to the variable j, then in a step S35 it is determined whether or not a medium ring object 104 is rendered in a render area of area [2][j]. If "YES" in the step S35, i.e., if a medium ring object 104 is rendered in the render area of area [2][j], then the processing proceeds to a step S37 in FIG. 15 to perform overlap determination using the medium ring object 104 as a target object. On the other hand, if "NO" in the step S35, objects are rendered in render areas without any clearance therebetween as viewed from a bird's eye view screen, in turn indicating that a small ring object 106 is rendered in a render area of area [3][j], then in order to perform overlap determination using the small ring object 106 as a target object, the processing proceeds to a step S41 shown in FIG. 15.

As shown in FIG. 15, in the step S37, a radius of the medium ring object 104 is set to a variable r. In a step S39, a location P (location coordinates) of the medium ring object 104 rendered in the render area of area [2][j] is obtained and the processing proceeds to a step S45. In the step S41, a radius of the small ring object 106 is set to a variable r. In a step S43, a location P of the small ring object 106 rendered in the render area of area [3][j] is obtained and the processing proceeds to the step S45.

In the step S45, a distance d between the half-line L and the location P is calculated. In a step S47, by adding the variable r to the distance d, a distance D is calculated (D=d+r). Then, in a step S49, it is determined whether or not the distance D is less than or equal to the variable R. That is, it is determined whether or not the target object overlaps the focused object. If "NO" in the step S49, i.e., if the distance D is greater than the variable R, then it is determined that the target object does not overlap the focused object, and in a step S53, the variable j is incremented (j=j+1) and then the processing returns to the step S29 shown in FIG. 14.

If "YES" in the step S49, i.e., if the distance D is less than or equal to the variable R, then it is determined that the target object overlaps the focused object, and thus, in a step S51 the medium ring object 104 rendered in the render area of area [2][j] or the small ring object 106 rendered in the render area of area [3][j] determined to overlap the focused object is set, as a deletion candidate, so as to be associated with the render area of area [1][j], and the processing proceeds to the step S53. That is, deletion candidate data 72e in which identification information of the focused object is associated with identification information of the target object is stored in the data memory area 72.

Figure 16:
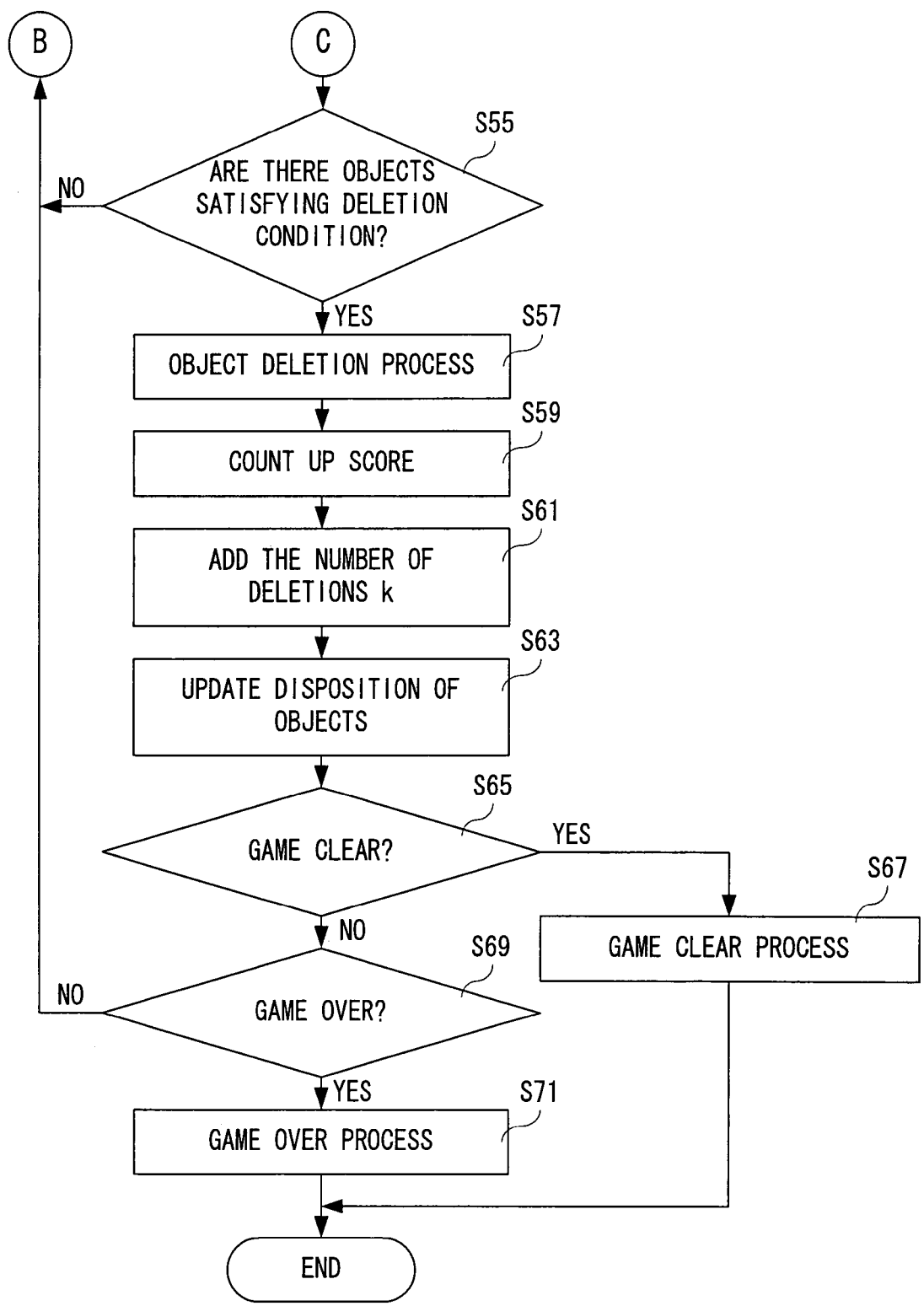
FIG. 16 is a flowchart showing yet another part of the overall game processing of the CPU core shown in FIG. 2 and being subsequent to the flowcharts of FIGS. 13 to 15.

As described above, when the overlap determination process has ended, the determination in the step S23 becomes "YES", and in the step S55 shown in FIG. 16 it is determined whether or not there are objects (102, 104, and 106) satisfying the deletion condition. Here, the CPU core 34 determines by referring to the deletion candidate data 72e whether or not there are a medium ring object 104 and a small ring object 106 associated with one same large ring object 102. Then, when there are a medium ring object 104 and a small ring object 106 associated with one same large ring object 102, the CPU core 34 determines that the deletion condition is satisfied. On the other hand, when a medium ring object 104 and a small ring object 106 are associated with different large ring objects 102, or when two medium ring objects 104 are associated with one same large ring object 102, or when two small ring objects 106 are associated with one same large ring object 102, the CPU core 34 determines that the deletion condition is not satisfied.

If "NO" in the step S55, i.e., if there are no objects (102, 104, and 106) satisfying the deletion condition, then the processing returns to the step S3 shown in FIG. 13. On the other hand, if "YES" in the step S55, i.e., if there are objects (102, 104, and 106) satisfying the deletion condition, then in a step S57 an object deletion process is performed. Here, a set of a large ring object 102, a medium ring object 104, and a small ring object 106 satisfying the deletion condition is deleted. When there are a plurality of sets of objects, the plurality of sets of objects (102, 104, and 106) are deleted. Specifically, corresponding ones of the object 1 data 730 to the object n data 73n on objects (102, 104, and 106) to be deleted are deleted from the data memory area 72.

In a subsequent step S59, a score is counted up. That is, points are added. Then, in a step S61, the number k of deletions is added. Here, the number of objects deleted in the object deletion process in the step S57 is added. Subsequently, in a step S63, the disposition of objects is updated. That is, to dispose objects (102, 104, and/or 106) in render areas from which the objects are deleted by the deletion process, objects (102, 104, and 106) are moved spirally. Then, new objects (102, 104, and/or 106) of the same number as the number of the deleted objects (102, 104, and 106) are added. The types (sizes) of objects (102, 104, and/or 106) to be added are randomly set.

Then, in a step S65, it is determined whether or not the game is cleared. In the present embodiment, the CPU core 34 obtains a game clear condition by referring to the game clear condition data 72f. The CPU core 34 detects the number k of deletions by referring to the number-of-deleted-object data 72i and obtains the play time of the puzzle game by referring to the play time timer 72j. The CPU core 34 then determines whether or not the game clear condition is satisfied. Specifically, the CPU core 34 determines whether or not at least the predetermined number of objects (102, 104, and 106) are deleted within the first certain period of time (three minutes). If "YES" in the step S65, i.e., if the game is cleared, then in a step S67 a game clear process is performed and the overall game processing ends. In the step S67, the CPU core 34 displays, for example, a game screen 100 showing that the game is cleared, updates the game level or aspect (stage), and saves game data.

On the other hand, if "NO" in the step S65, i.e., if the game is not cleared, then in a step S69 it is determined whether or not the game is over. In the present embodiment, as with the determination as to whether or not the game is cleared, the CPU core 34 determines by referring to the game over condition data 72g, the number-of-deleted-object data 72i, and the play time timer 72j whether or not the predetermined number of objects (102, 104, and 106) are not deleted within the first certain period of time. If "NO" in the step S69, i.e., if the game is not over, then the processing returns to the step S3 there. On the other hand, if "YES" in the step S69, i.e., if the game is over, then in a step S71 a game over process is performed and the overall game processing ends. In the step S71, the CPU core 34 displays, for example, a game screen 100 showing that the game is over.

According to the present embodiment, when, according to a player's operation, the point of gaze is set and a viewpoint is changed, whereby ring-shaped objects satisfy the predetermined condition, the objects having satisfied the predetermined condition are deleted, and thus, a new puzzle game can be provided.

Although, in the present embodiment, objects with different ring sizes, i.e., objects with similar figures, are disposed on different layers, it is also possible that objects with different colors or shapes or objects with different colors and shapes may be disposed on different layers.

Although, in the present embodiment, the deletion condition is satisfied when a medium ring object and a small ring object overlap with each other so as to be contained in a large ring object, the deletion condition is not limited thereto and the deletion condition may be satisfied when large, medium, and small ring objects overlap one another at least partially.

Furthermore, although, in the present embodiment, three layers are provided and the number of render areas for each layer is set to 20 (4×5), the number of layers may be two or more and it is also possible to provide four or more layers. Render areas can be appropriately changed according to the number of layers, the difficulty level of a game, or the like.

Although, in the present embodiment, the point of gaze is set by touching a small ring object, the point of gaze may be set by touching a medium ring object or a large ring object. In either case, the point of gaze is set to the disposition location (center coordinates) of a touched object and when a viewpoint is moved, the distance between the viewpoint and the point of gaze is kept constant. However, depending on a case, the length of a half-line needs to be extended.

Although, in the present embodiment, in the three-dimensional virtual space, whether or not objects overlap one another is determined based on the line of sight, the determination is not necessarily limited thereto. For example, overlap determination may be made based on a two-dimensional game image generated by rendering. To describe it briefly, in such a case, unique identification information (IDs) are assigned to all objects. A buffer for polygon IDs is additionally provided and a circle with the same radius as an object is rendered in the buffer in order from objects on the furthest layer (bottom layer). At this time, a location (pixel) where an ID is already written is not overwritten. After circles for all objects have been rendered, whether or not an area with a given ID is surrounded by an area with another ID is checked pixel by pixel. When the area with the given ID is surrounded by the area with another ID, it indicates that objects with those IDs overlap with each other.

Although, in the present embodiment, a touch panel is used as a pointing device, it is also possible to use other pointing devices such as a pen tablet, a touch pad, and a computer mouse. It is, of course, possible to use conventional operation switches. Note, however, that when other pointing devices or operation switches are used, there is a need to display a pointing image, such as a mouse pointer, for indicating a pointed location on a screen.

The configuration of the game apparatus should not be limited to the configuration in the above-described embodiment. For example, a single LCD may be provided or a touch panel may be provided to each of the two LCDs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage medium storing a game program to be performed by a game apparatus comprising a display, an operation device, and a storage unit, said game program causing a computer of said game apparatus to perform:

disposing a plurality of objects each having any one of a predetermined number of attributes in a three-dimensional virtual space based on object data stored in said storage unit;

setting a point of gaze based on an input by said operation device;

setting, after the point of gaze is set, a viewpoint in said three-dimensional virtual space based on the input by said operation device;

displaying a game image on said display based on the set point of gaze and the set viewpoint;

computing a line of sight and a straight line parallel to the line of sight based on the set point of gaze set and the set viewpoint;

determining whether or not the attributes of said plurality of objects intersecting the line of sight or the straight line parallel to the calculated line of sight satisfy a predetermined condition; and deleting, when it is determined that the predetermined condition is satisfied, objects satisfying the predetermined condition.

2. A storage medium storing a game program according to claim 1, wherein in disposing the plurality of objects, on a predetermined number of layers parallel to each other, objects unique to the layers, respectively, are disposed so as not to overlap with each other between the layers.

3. A storage medium storing a game program according to claim 2, wherein in displaying the game image, a bird's eye view image from a vertical direction of the predetermined number of said layers parallel to each other is displayed as a game image until at least the point of gaze is set.

4. A storage medium storing a game program according to claim 2, wherein said objects unique to the layers, respectively, have an attribute of a largest size on a top layer and have an attribute of a smallest size on a bottom layer, when said bird's eye view image is displayed as the game image.

5. A storage medium storing a game program according to claim 2, wherein in deleting the objects satisfying a predetermined condition, when, on adjacent said layers, sizes of objects intersecting said line of sight or said straight line become smaller toward a side of said point of gaze from a side of said viewpoint and the objects are aligned in a predetermined number, the objects are deleted.

6. A storage medium storing a game program according to claim 2, wherein in disposing the plurality of objects, objects being stored in said storage unit, being hollow inside in a direction vertical to said layers and having an outer rim, are disposed based on said object data.

7. A game apparatus comprising a display, an operation device, and a storage unit, said game apparatus comprising:

object disposition programmed logic circuitry for disposing a plurality of objects each having any one of a predetermined number of attributes in a three-dimensional virtual space based on object data stored in said storage unit;

a point-of-gaze setter for setting a point of gaze based on an input by said operation device;

a viewpoint setter for setting, after the point of gaze is set by said point-of-gaze setter, a viewpoint in said three-dimensional virtual space based on the input by said operation device;

a game image displayer for displaying a game image on said display based on the point of gaze set by said point-of-gaze setter and the viewpoint set by said viewpoint setter;

a line-of-sight calculator for computing a line of sight and a straight line parallel to the line of sight based on the point of gaze set by said point-of-gaze setter and the viewpoint set by said viewpoint setter;

determination programmed logic circuitry for determining whether or not the attributes of said plurality of objects intersecting the line of sight or the straight line parallel to the line of sight calculated by said line-of-sight calculator satisfy a predetermined condition; and deletion programmed logic circuitry for deleting, when it is determined by said determination programmed logic circuitry that the predetermined condition is satisfied, objects satisfying the predetermined condition.

8. A game control method for a game apparatus comprising a display, an operation device, and a storage unit, said method including:

(a) disposing a plurality of objects each having any one of a predetermined number of attributes in a three-dimensional virtual space based on object data stored in said storage unit;

(b) setting a point of gaze based on an input by said operation device;

(c) setting, after the point of gaze is set in (b), a viewpoint in said three-dimensional virtual space based on the input by said operation device;

(d) displaying a game image on said display based on the point of gaze set in (b) and the viewpoint set in (c);

(e) computing a line of sight and a straight line parallel to the line of sight based on the point of gaze set in (b) and the viewpoint set in (c);

(f) determining whether or not the attributes of said plurality of objects intersecting the line of sight or the straight line parallel to the line of sight calculated in (e) satisfy a predetermined condition; and (g) deleting, when it is determined in (f) that the predetermined condition is satisfied, objects satisfying the predetermined condition.

* * * * *